United States Patent
Hori et al.

(10) Patent No.: US 12,352,956 B2
(45) Date of Patent: Jul. 8, 2025

(54) PICTURE GENERATION APPARATUS, REFLECTOR, AND HEAD-UP DISPLAY

(71) Applicant: KOITO MANUFACTURING CO., LTD., Tokyo (JP)

(72) Inventors: Masahiro Hori, Shizuoka (JP); Masayoshi Watanabe, Shizuoka (JP); Takashi Yamamoto, Shizuoka (JP); Masashi Katayama, Shizuoka (JP); Mamoru Kosuge, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 381 days.

(21) Appl. No.: 17/914,648

(22) PCT Filed: Mar. 10, 2021

(86) PCT No.: PCT/JP2021/009630
§ 371 (c)(1),
(2) Date: Sep. 26, 2022

(87) PCT Pub. No.: WO2021/193074
PCT Pub. Date: Sep. 30, 2021

(65) Prior Publication Data
US 2023/0350198 A1    Nov. 2, 2023

(30) Foreign Application Priority Data

Mar. 26, 2020 (JP) .................... 2020-055742
Mar. 26, 2020 (JP) .................... 2020-055743
(Continued)

(51) Int. Cl.
*G02B 27/01* (2006.01)
*B60K 35/00* (2024.01)
*B60K 35/23* (2024.01)

(52) U.S. Cl.
CPC .......... *G02B 27/0101* (2013.01); *B60K 35/00* (2013.01); *G02B 27/0149* (2013.01); *B60K 35/23* (2024.01); *B60K 2360/23* (2024.01)

(58) Field of Classification Search
CPC ..... G02B 27/00–648; G02B 2027/0105–0198; B60K 35/00–90; B60K 2370/00; B60K 2360/00–96
See application file for complete search history.

(56) References Cited

U.S. PATENT DOCUMENTS

| | | | |
|---|---|---|---|
| 2015/0016089 A1 | 1/2015 | Werman et al. | |
| 2018/0067311 A1 | 3/2018 | Yokota et al. | |

(Continued)

FOREIGN PATENT DOCUMENTS

| | | |
|---|---|---|
| CN | 204037446 U | 12/2014 |
| CN | 209273874 U | 8/2019 |

(Continued)

OTHER PUBLICATIONS

Extended European Search Report issued in the corresponding EP application No. 21775656.8, dated Aug. 18, 2023. (7 Pages).
(Continued)

*Primary Examiner* — Christopher A Lamb, II
(74) *Attorney, Agent, or Firm* — Osha Bergman Watanabe & Burton LLP

(57) ABSTRACT

A picture generation apparatus includes: a light source substrate on which a light source is mounted; an optical member through which light emitted from the light source is transmitted; a display device configured to form, by the light transmitted through the optical member, light for generating a predetermined picture; a heat sink configured to dissipate heat generated from the light source substrate; and a lens holder configured to hold the optical member. The lens holder includes first engagement portions, and the heat sink (Continued)

includes second engagement portions. Each of the first engagement portions and a respective one of the second engagement portions are fixed to each other, so that the light source substrate is positioned and fixed in a state of being interposed between the lens holder and the heat sink.

6 Claims, 24 Drawing Sheets

(30) Foreign Application Priority Data

| Apr. 24, 2020 | (JP) | 2020-077611 |
|---|---|---|
| Apr. 24, 2020 | (JP) | 2020-077612 |
| May 20, 2020 | (JP) | 2020-088272 |

(56) References Cited

U.S. PATENT DOCUMENTS

| 2018/0348619 A1 | 12/2018 | Taniguchi |
| 2019/0219821 A1* | 7/2019 | Sugiyama ............ G02B 27/285 |
| 2020/0339147 A1 | 10/2020 | Hayakawa et al. |

FOREIGN PATENT DOCUMENTS

| JP | H03-103725 U | 10/1991 |
|---|---|---|
| JP | H11-278100 A | 10/1999 |
| JP | 2008-208257 A | 9/2008 |
| JP | 2009-265287 A | 11/2009 |
| JP | 2010-089326 A | 4/2010 |
| JP | 2016-046650 A | 4/2016 |
| JP | 2016-147502 A | 8/2016 |
| JP | 2016-212292 A | 12/2016 |
| JP | 2018-031861 A | 3/2018 |
| JP | 2018-054966 A | 4/2018 |
| JP | 2018-083593 A | 5/2018 |
| JP | 2018-137089 A | 8/2018 |
| JP | 2018-205427 A | 12/2018 |
| JP | 2019-023702 A | 2/2019 |
| JP | 2019-031121 A | 2/2019 |
| JP | 2019-119262 A | 7/2019 |
| JP | 2019-132990 A | 8/2019 |
| JP | 2019-179720 A | 10/2019 |
| JP | 2019-182223 A | 10/2019 |
| KR | 20150137723 A | 12/2015 |
| WO | 2017-208961 A1 | 12/2017 |
| WO | 2020-059619 A1 | 3/2020 |

OTHER PUBLICATIONS

International Search Report in corresponding International Application No. PCT/JP2021/009630, dated May 25, 2021 (15 pages).
Written Opinion in corresponding International Application No. PCT/JP2021/009630, dated May 25, 2021 (11 pages).

* cited by examiner

PICTURE GENERATION APPARATUS, REFLECTOR, AND HEAD-UP DISPLAY

TECHNICAL FIELD

The present invention relates to a picture generation apparatus and a head-up display including the picture generation apparatus.

The present invention also relates to a reflector and a head-up display including the reflector.

The present invention also relates to a head-up display.

BACKGROUND ART

In a future automatic driving society, it is expected that visual communication between a vehicle and a person becomes more and more important. For example, it is expected that visual communication between a vehicle and an occupant in the vehicle becomes more and more important. In this regard, the visual communication between the vehicle and the occupant can be implemented using a head-up display (HUD). The head-up display can implement so-called augmented reality (AR) by projecting a picture or a video onto a windshield or a combiner, and superimposing the picture on a real space through the windshield or the combiner so as to cause the occupant to visually recognize the picture.

Patent Literature 1 discloses a display device used in a head-up display apparatus that displays information on a windshield or the like of a vehicle.

Patent Literature 2 discloses an in-vehicle HUD apparatus that displays a predetermined content in a predetermined display area provided in front of a driver seat.

Patent Literature 3 discloses a head-up display apparatus for a vehicle that includes a display and a reflection device and that displays a virtual image of display information in a forward field of view of a driver. The head-up display apparatus for the vehicle disclosed in Patent Literature 3 includes a concave mirror having a rectangular front surface shape, and the concave mirror includes a holder portion disposed on a rear surface side.

Patent Literature 4 discloses a head-up display apparatus for a vehicle that is mounted in the vehicle and displays a virtual image of display information in a forward field of view of a driver. The head-up display apparatus for the vehicle disclosed in Patent Literature 4 includes a display, a reflection unit that reflects light emitted from the display, a stepping motor that rotates the reflection unit, and a control device that controls rotation of the reflection unit by controlling the stepping motor.

In a head-up display, light emitted from a picture generation apparatus is reflected by a reflector and is emitted to a windshield of a vehicle or a combiner. As the reflector, concave mirrors as disclosed in Patent Literatures 5 and 6 are generally known.

CITATION LIST

Patent Literature

Patent Literature 1: JP-A-2018-83593
Patent Literature 2: JP-A-2019-119262
Patent Literature 3: JP-A-2018-54966
Patent Literature 4: JP-A-2016-46650
Patent Literature 5: JP-A-2019-132990
Patent Literature 6: International Application No. WO 2017/208961

SUMMARY OF INVENTION

Technical Problem

Incidentally, in an existing head-up display as in Patent Literature 1, it is necessary to reduce manufacturing cost of a substrate on which a light source included in the display device is mounted.

Therefore, an object of the present invention is to provide a picture generation apparatus whose manufacturing cost can be reduced, and a head-up display including the picture generation apparatus.

In an existing head-up display, there is room for improvement in a configuration in which a display range of a predetermined content is enlarged.

Therefore, an object of the present invention is to provide a picture generation apparatus capable of enlarging a display range of a picture at low cost and capable of preventing external light or reflected light from adversely affecting generation of the picture, and a head-up display including the picture generation apparatus.

There is room for further improvement in the concave mirror as disclosed in Patent Literature 3.

Therefore, an object of the present invention is to provide a reflector that can be increased in size and whose moldability can be improved, and a head-up display including the reflector.

In a head-up display, there is room for improvement in a mounting structure of a reflection unit to a housing.

Therefore, an object of the present invention is to provide a head-up display in which a reflection unit can be mounted with low cost and a simple configuration.

In a general method for manufacturing a concave mirror, a substrate is molded from a resin by using a mold, and a reflective film is formed on a surface of the molded substrate by a vapor deposition process. When the substrate is molded, since two surfaces constituting each of corners thereof are in contact with the mold, corner portions of the substrate are cooled and solidified more easily and are molded and shrunk more hardly as compared with other portions. Therefore, a difference in shrinkage between the outer peripheral corner portions and the other portions can be generated, and the substrate may be distorted. When the concave mirror in which the substrate is distorted is used in a head-up display, a problem particularly arises that characters at an outer peripheral portion of a video are distorted and displayed.

Therefore, an object of the present invention is to provide a reflector in which a substrate is prevented from being distorted during molding, and a head-up display using the reflector.

Solution to Problem

In order to achieve one of the above objects, a picture generation apparatus according to one aspect of the present invention is
a picture generation apparatus that generates a picture for a head-up display, the picture generation apparatus including:
 a light source substrate on which a light source is mounted;
 an optical member through which light emitted from the light source is transmitted;

a display device configured to form, by the light transmitted through the optical member, light for generating the predetermined picture;
a heat sink configured to dissipate heat generated from the light source substrate; and
a holder configured to hold the optical member,
in which the holder includes a plurality of first engagement portions, and the heat sink includes a plurality of second engagement portions that are respectively provided at positions corresponding to the plurality of first engagement portions, and
in which each of the plurality of first engagement portions and a respective one of the plurality of second engagement portions are fixed to each other, so that the light source substrate is positioned and fixed in a state of being interposed between the holder and the heat sink and being accommodated in a space that is formed among the plurality of first engagement portions.

In order to achieve one of the above objects, a picture generation apparatus according to one aspect of the present invention is
a picture generation apparatus that generates a picture for a head-up display, the picture generation apparatus including:
a change picture generation unit configured to generate a change picture in the picture, the change picture changing according to a condition of the vehicle; and
a fixed picture generation unit configured to generate a fixed picture in the picture, the fixed picture being fixed regardless of the condition,
in which the change picture generation unit includes:
  a light source substrate on which a light source is mounted;
  an optical member through which light emitted from the light source is transmitted; and
  a display device configured to form, by the light transmitted through the optical member, light for generating a predetermined picture,
in which the light source substrate is disposed so as to be inclined by a predetermined angle with respect to a first light emitting surface of the display device, and
in which a second light emitting surface of the fixed picture generation unit is a surface parallel to the first light emitting surface.

A head-up display according to one aspect of the present invention includes:
any one of the above picture generation apparatuses; and
at least one reflection unit configured to reflect the light emitted by the picture generation apparatus such that the light is emitted to a windshield or a combiner.

In order to achieve one of the above objects, a reflector according to one aspect of the present invention is
a reflector that is rotatable about a rotation axis, the reflector including:
a plate-shaped main body portion including a reflective surface configured to reflect light, a first end surface, and a second end surface located on a side opposite to the first end surface with respect to the reflective surface;
a plate-shaped first protruding portion protruding toward a back surface side of the reflective surface so as to be continuous from the first end surface;
a plate-shaped second protruding portion protruding toward the back surface side so as to be continuous from the second end surface;
a first shaft portion provided on the first protruding portion in order to rotate the main body portion about the rotation axis; and
a second shaft portion provided on the second protruding portion in order to rotate the main body portion about the rotation axis,
in which a tip end of the first protruding portion is located at a position different from the first end surface in a direction along the rotation axis and located on a side opposite to the reflective surface.

In order to achieve one of the above objects, a reflector according to one aspect of the present invention is
a reflector including:
a substrate that includes a first surface and a second surface located on a side opposite to the first surface; and
a reflective film formed on the first surface and configured to reflect light,
in which at least a part of end portions of the substrate is formed, between the first surface and the second surface, with a surface that forms at least three obtuse angles in a cross section of the substrate in a thickness direction.

A head-up display according to one aspect of the present invention is
a head-up display provided in a vehicle and configured to display a predetermined picture to an occupant in the vehicle, the head-up display including:
the above reflector; and
a picture generation apparatus configured to generate the predetermined picture and emit light to the reflector.

In order to achieve one of the above objects, a head-up display according to one aspect of the present invention is
a head-up display provided in a vehicle and configured to display a predetermined picture to an occupant in the vehicle, the head-up display including:
a picture generation unit configured to emit light for generating the predetermined picture;
a reflection unit configured to reflect the light emitted by the picture generation unit such that the light is emitted to a windshield or a combiner; and
a housing that accommodates the picture generation unit and the reflection unit,
in which the reflection unit includes a main body portion, a first shaft portion protruding outward from one end portion of the main body portion, and a second shaft portion protruding outward from the other end portion of the main body portion,
in which the housing includes at least a first accommodation portion configured to accommodate an end portion of the first shaft portion, and
in which the end portion is exposed to an outside from the first accommodation portion.

Advantageous Effects of Invention

According to the present invention, it is possible to provide a picture generation apparatus whose manufacturing cost can be reduced, and a head-up display including the picture generation apparatus.

Further, according to the present invention, it is possible to provide a picture generation apparatus capable of enlarging a display range of a picture at low cost and capable of preventing external light or reflected light from adversely affecting generation of the picture, and a head-up display including the picture generation apparatus.

Further, according to the present invention, it is possible to provide a reflector that can be increased in size and whose moldability can be improved, and a head-up display including the reflector.

According to a reflector of the present invention, a part of end portions of a substrate is formed with a surface that forms at least three obtuse angles, and thus the part of the end portions is cooled and solidified more hardly as compared with a case where an acute angle or 90 degrees is formed at the part of the end portions during molding. Therefore, distortion of the substrate during the molding is prevented.

Further, according to the present invention, it is possible to provide a head-up display in which a reflection unit can be mounted with low cost and a simple configuration.

DESCRIPTION OF EMBODIMENTS

Figure 1:
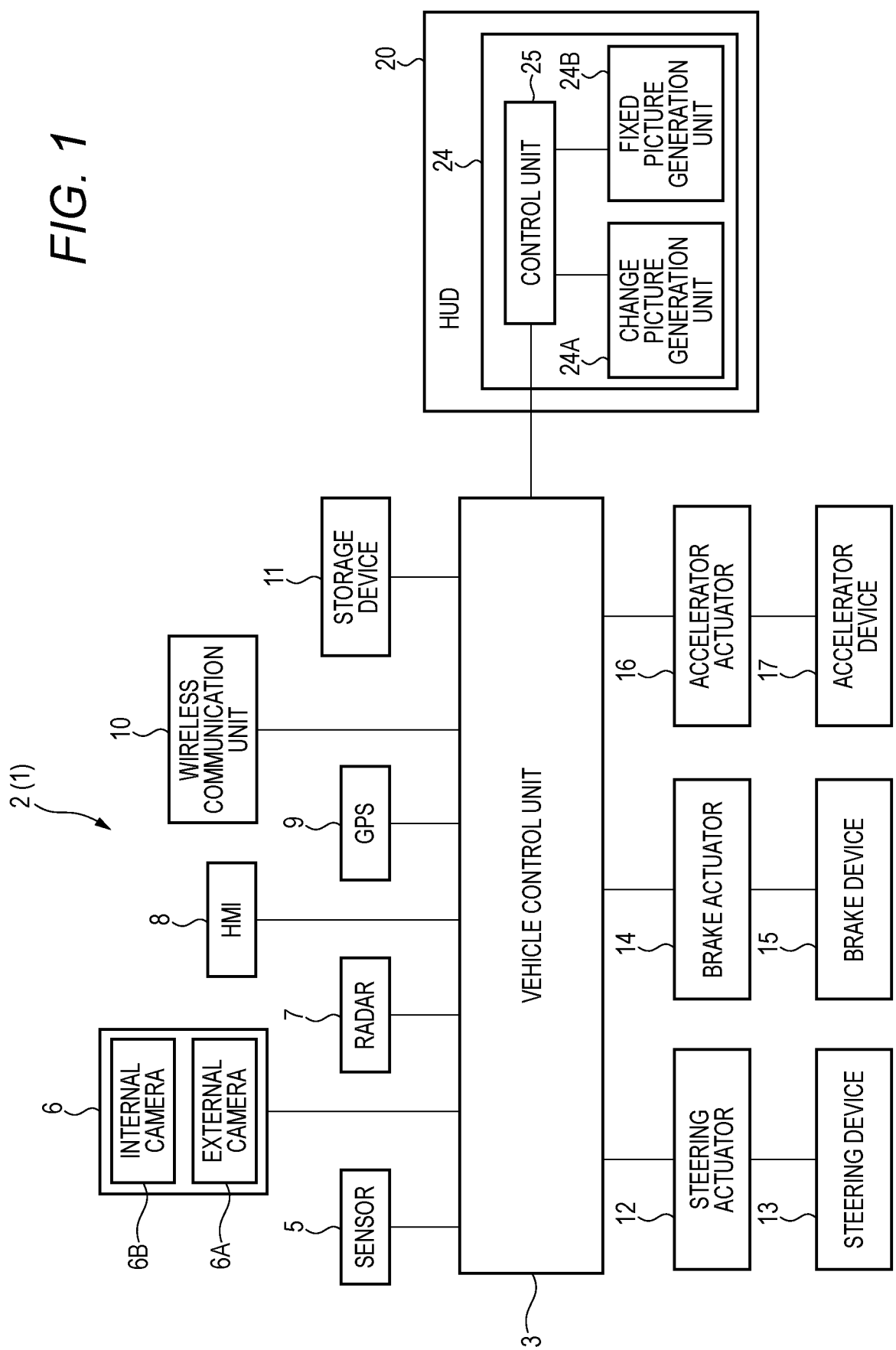
FIG. 1 is a block diagram of a vehicle system including a head-up display (HUD) according to an embodiment of the present invention.

Hereinafter, embodiments of the present invention (hereinafter, referred to as the present embodiments) will be described with reference to the drawings. Dimensions of members shown in the drawings may be different from actual dimensions of the respective members for convenience of description.

In description of the present embodiments, for convenience of the description, a "left-right direction", an "up-down direction", and a "front-rear direction" may be referred to as appropriate. These directions are relative directions set for a head-up display (HUD) 20 shown in FIG. 2. Here, the "left-right direction" is a direction including a "leftward direction" and a "rightward direction". The "up-down direction" is a direction including an "upward direction" and a "downward direction". The "front-rear direction" is a direction including a "frontward direction" and a "rearward direction". Although not shown in FIG. 2, the left-right direction is a direction orthogonal to the up-down direction and the front-rear direction.

A vehicle system 2 including the HUD 20 according to the present embodiment will be described below with reference to FIG. 1. FIG. 1 is a block diagram of the vehicle system 2. A vehicle 1 in which the vehicle system 2 is mounted is a vehicle (automobile) that can travel in an automatic driving mode.

As shown in FIG. 1, the vehicle system 2 includes a vehicle control unit 3, a sensor 5, a camera 6, a radar 7, a human machine interface (HMI) 8, a global positioning system (GPS) 9, a wireless communication unit 10, and a storage device 11. The vehicle system 2 further includes a steering actuator 12, a steering device 13, a brake actuator 14, a brake device 15, an accelerator actuator 16, and an accelerator device 17. The vehicle system 2 further includes the HUD 20.

The vehicle control unit 3 is configured to control traveling of the vehicle 1. The vehicle control unit 3 is implemented by, for example, at least one electronic control unit (ECU). The electronic control unit includes: a computer system (for example, a system on a chip (SoC) or the like) including one or more processors and one or more memories; and an electronic circuit including an active element such as a transistor and a passive element such as a resistor. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read only memory (ROM) and a random access memory (RAM). The ROM may store vehicle control programs. For example, the vehicle control programs may include an artificial intelligence (AI) program for automatic driving. The AI program is a program (trained model) constructed by supervised or unsupervised machine learning (in particular, deep learning) using a multilayer neural network. The RAM may temporarily store the vehicle control programs, vehicle control data, and/or surrounding environment information indicating a surrounding environment of the vehicle 1. The processor may be configured to load, onto the RAM, a program designated from the various vehicle control programs stored in the ROM, and to execute various processes in cooperation with the RAM. The computer system may be implemented by a non-von Neumann computer such as an application specific integrated circuit (ASIC) or a field-programmable gate array (FPGA). Furthermore, the computer system may be implemented by a combination of a von Neumann computer and a non-von Neumann computer.

The sensor 5 includes at least one of an acceleration sensor, a speed sensor, and a gyro sensor. The sensor 5 is configured to detect a traveling state of the vehicle 1 and output traveling state information to the vehicle control unit 3. The sensor 5 may further include a seating sensor that detects whether a driver is seated on a driver seat, a face orientation sensor that detects an orientation of a face of the driver, an external weather sensor that detects an external weather condition, a human sensor that detects whether a person is present in the vehicle, and the like.

The camera 6 is, for example, a camera including an imaging element such as a charge-coupled device (CCD) or a complementary MOS (CMOS). The camera 6 includes one or more external cameras 6A and an internal camera 6B.

The external camera 6A is configured to acquire picture data indicating the surrounding environment of the vehicle 1 and then transmit the picture data to the vehicle control unit 3. The vehicle control unit 3 acquires the surrounding environment information based on the transmitted picture data. Here, the surrounding environment information may include information related to an object (a pedestrian, another vehicle, a sign, or the like) present outside the vehicle 1. For example, the surrounding environment information may include information related to an attribute of the object present outside the vehicle 1, and information related to a distance and a position of the object relative to the vehicle 1. The external camera 6A may be formed as a monocular camera or a stereo camera.

The internal camera 6B is disposed inside the vehicle 1 and is configured to acquire picture data indicating an occupant. The internal camera 6B functions as, for example, an eye tracking camera that tracks a viewpoint E (which is to be described later in FIG. 2) of the occupant. The internal camera 6B is provided, for example, in the vicinity of a rear-view mirror, inside an instrument panel, or the like.

The radar 7 includes at least one of a millimeter wave radar, a microwave radar, and a laser radar (for example, a LiDAR unit). For example, the LiDAR unit is configured to detect the surrounding environment of the vehicle 1. In particular, the LiDAR unit is configured to acquire 3D mapping data (point cloud data) indicating the surrounding environment of the vehicle 1 and then transmit the 3D mapping data to the vehicle control unit 3. The vehicle control unit 3 specifies the surrounding environment information based on the transmitted 3D mapping data.

The HMI 8 includes an input unit that receives an input operation from the driver, and an output unit that outputs traveling information or the like to the driver. The input unit includes a steering wheel, an accelerator pedal, a brake pedal, a driving mode switch that switches a driving mode of the vehicle 1, and the like. The output unit is a display (excluding the HUD) that displays various types of traveling information.

The GPS 9 is configured to acquire current position information of the vehicle 1 and output the acquired current position information to the vehicle control unit 3.

The wireless communication unit 10 is configured to receive, from another vehicle around the vehicle 1, information (for example, traveling information or the like) related to the another vehicle, and transmit information (for example, the traveling information or the like) related to the vehicle 1 to the another vehicle (vehicle-to-vehicle communication). Further, the wireless communication unit 10 is configured to receive infrastructure information from infrastructure equipment such as a traffic light or a sign lamp, and transmit the traveling information of the vehicle 1 to the infrastructure equipment (road-to-vehicle communication). Further, the wireless communication unit 10 is configured to receive information related to a pedestrian from a portable electronic device (a smart phone, a tablet, a wearable device, or the like) carried by the pedestrian, and transmit the own vehicle traveling information of the vehicle 1 to the portable electronic device (pedestrian-to-vehicle communication). The vehicle 1 may directly communicate with the another vehicle, the infrastructure equipment, or the portable electronic device in an ad-hoc mode, or may communicate with the another vehicle, the infrastructure equipment, or the portable electronic device via an access point. Furthermore, the vehicle 1 may communicate with the another vehicle, the infrastructure equipment, or the portable electronic device via a communication network (not shown). The communication network includes at least one of the Internet, a local area network (LAN), a wide area network (WAN), and a radio access network (RAN). A wireless communication standard is, for example, Wi-Fi (registered trademark), Bluetooth (registered trademark), ZigBee (registered trademark), LPWA, DSRC (registered trademark) or Li-Fi. Further, the vehicle 1 may communicate with the another vehicle, the infrastructure equipment, or the portable electronic device by using a fifth generation mobile communication system (5G).

The storage device 11 is an external storage device such as a hard disk drive (HDD) or a solid state drive (SSD). The storage device 11 may store two-dimensional or three-dimensional map information and/or a vehicle control program. For example, the three-dimensional map information may include 3D mapping data (point cloud data). The storage device 11 is configured to output the map information and the vehicle control program to the vehicle control unit 3 in response to a request from the vehicle control unit 3. The map information and the vehicle control program may be updated via the wireless communication unit 10 and the communication network.

When the vehicle 1 travels in the automatic driving mode, the vehicle control unit 3 automatically generates at least one of a steering control signal, an accelerator control signal, and a brake control signal based on the traveling state information, the surrounding environment information, the current position information, the map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. In this way, the vehicle control unit 3 automatically controls the traveling of the vehicle 1 based on the traveling state information, the surrounding environment information, the current position information, the map information, and the like. That is, in the automatic driving mode, the traveling of the vehicle 1 is automatically controlled by the vehicle system 2.

On the other hand, when the vehicle 1 travels in a manual driving mode, the vehicle control unit 3 generates the steering control signal, the accelerator control signal, and the brake control signal in accordance with manual operations of the driver on the accelerator pedal, the brake pedal, and the steering wheel. In this way, in the manual driving mode, the steering control signal, the accelerator control signal, and the brake control signal are generated by the manual operations of the driver, and thus the traveling of the vehicle 1 is controlled by the driver.

As described above, the driving mode includes the automatic driving mode and the manual driving mode. The automatic driving mode includes, for example, a fully automatic driving mode, an advanced driving support mode, and a driving support mode. In the fully automatic driving mode, the vehicle system 2 automatically performs all traveling controls including a steering control, a brake control, and an accelerator control, and the driver cannot drive the vehicle 1. In the advanced driving support mode, the vehicle system 2 automatically performs all the traveling controls including the steering control, the brake control, and the accelerator control, and the driver can drive the vehicle 1 but does not drive the vehicle 1. In the driving support mode, the vehicle system 2 automatically performs a part of the traveling controls including the steering control, the brake control, and the accelerator control, and the driver drives the vehicle 1 under driving support of the vehicle system 2. On the other hand, in the manual driving mode, the vehicle system 2 does not automatically perform the traveling controls, and the driver drives the vehicle 1 without the driving support of the vehicle system 2.

The HUD 20 is configured to display predetermined information (hereinafter, referred to as HUD information) as a picture to the occupant in the vehicle 1 in a manner in which the HUD information is superimposed on a real space outside the vehicle 1 (in particular, a surrounding environment in front of the vehicle 1). The HUD information displayed by the HUD 20 is, for example, vehicle traveling information related to the traveling of the vehicle 1 and/or surrounding environment information related to the surrounding environment of the vehicle 1 (in particular, the information related to the object present outside the vehicle 1). The HUD 20 is an AR display that functions as a visual interface between the vehicle 1 and the occupant.

The HUD 20 includes a picture generation apparatus/unit (PGU) 24. The picture generation apparatus 24 includes a change picture generation unit 24A, a fixed picture generation unit 24B, and a control unit 25.

The picture generation apparatus 24 is configured to emit light for generating a predetermined picture to be displayed to the occupant in the vehicle 1. The change picture generation unit 24A emits light for generating a change picture in the predetermined picture, and the change picture changes according to a condition of the vehicle 1. The fixed picture generation unit 24B emits light for generating a fixed picture in the predetermined picture, and the fixed picture is fixed regardless of the condition of the vehicle 1.

The control unit 25 controls an operation of each unit of the HUD 20. The control unit 25 is connected to the vehicle control unit 3, generates control signals for controlling operations of the change picture generation unit 24A and the fixed picture generation unit 24B based on the vehicle traveling information, the surrounding environment information, and the like transmitted from the vehicle control unit 3, and transmits the generated control signals to the change picture generation unit 24A and the fixed picture generation unit 24B. The control unit 25 is mounted with a processor such as a central processing unit (CPU) and a memory, and executes, by the processor, a computer program read from the memory, to control operations of the change picture generation unit 24A, the fixed picture generation unit 24B, and the like. In the present embodiment, the vehicle control unit 3 and the control unit 25 are provided as separate components, but the vehicle control unit 3 and the control unit 25 may be integrally formed. For example, the vehicle control unit 3 and the control unit 25 may be implemented by a single electronic control unit.

Figure 2:
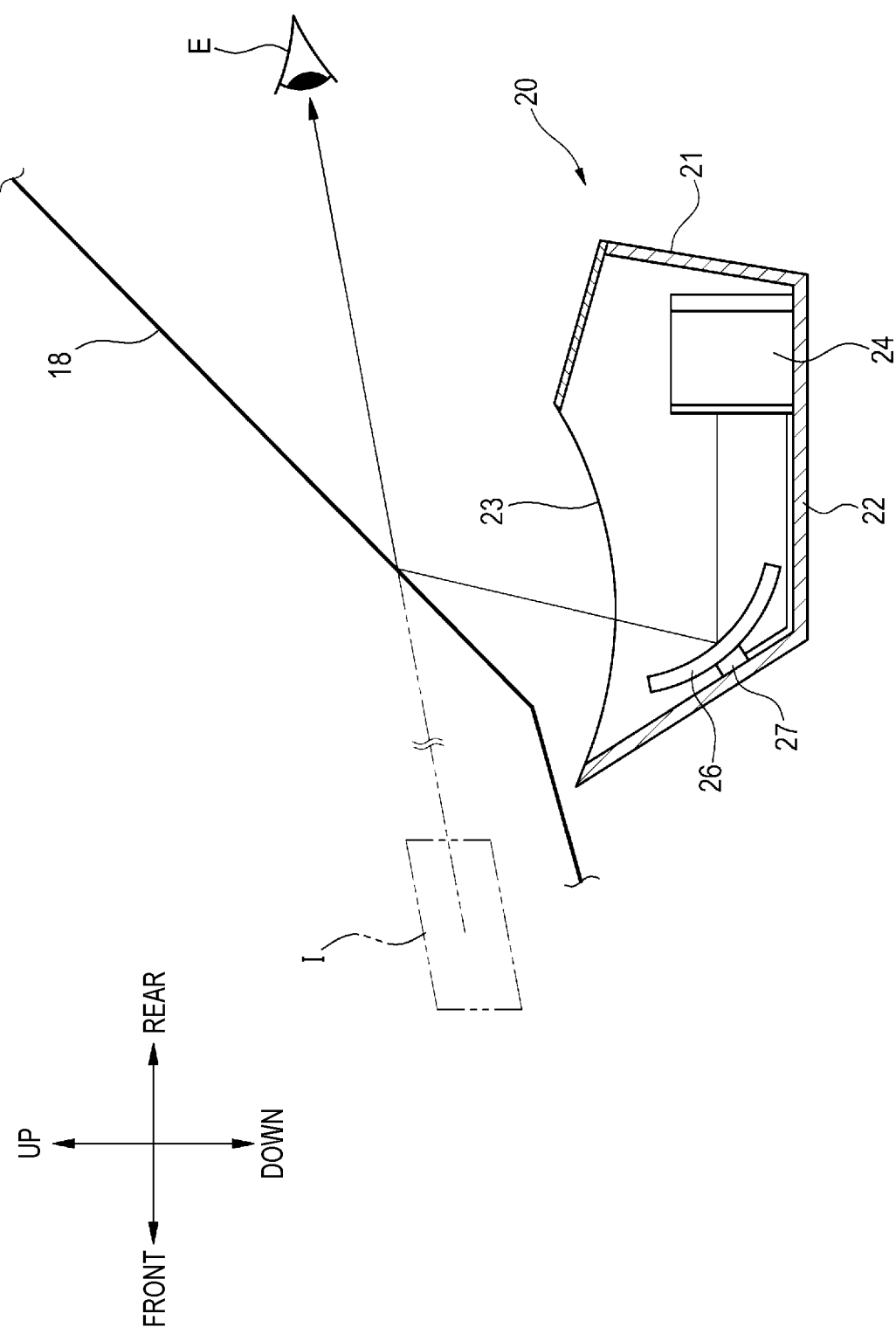
FIG. 2 is a schematic diagram showing a configuration of the HUD.

FIG. 2 is a schematic diagram of the HUD 20 when viewed from a side surface side of the vehicle 1. At least a part of the HUD 20 is located inside the vehicle 1. Specifically, the HUD 20 is provided at a predetermined position in an interior of the vehicle 1. For example, the HUD 20 may be disposed inside a dashboard of the vehicle 1.

As shown in FIG. 2, the HUD 20 includes an HUD main body portion 21. The HUD main body portion 21 includes a main body housing 22 and an emitting window 23. The emitting window 23 is formed of a transparent plate through which visible light is transmitted. The HUD main body portion 21 includes, inside the main body housing 22, the picture generation apparatus 24 and a concave mirror 26 (an example of a reflection unit).

The concave mirror 26 is disposed on an optical path of the light emitted from the picture generation apparatus 24 (the change picture generation unit 24A and the fixed picture generation unit 24B). The concave mirror 26 is configured to reflect, toward a windshield 18 (for example, a front window of the vehicle 1), the light emitted from the picture generation apparatus 24. The concave mirror 26 includes a reflective surface that is curved into a concave shape in order to form the predetermined picture, and reflects, at a predetermined magnification, a picture of the light that is emitted from the picture generation apparatus 24 and is used to form the picture. The concave mirror 26 may include a drive (rotation) mechanism 27, and may be configured such that an orientation of the concave mirror 26 can be rotated based on the control signals transmitted from the control unit 25 (see FIG. 1).

The picture generation apparatus 24 is provided in the main body housing 22 so as to face toward a front of the HUD 20. The light emitted from the picture generation apparatus 24 (the change picture generation unit 24A and the fixed picture generation unit 24B) is reflected by the concave mirror 26 and is then emitted from the emitting window 23 of the HUD main body portion 21. The light emitted from the emitting window 23 of the HUD main body portion 21 is emitted to the windshield 18. A part of the light emitted from the emitting window 23 to the windshield 18 is reflected toward the viewpoint E of the occupant. As a result, the occupant recognizes the light emitted from the HUD main body portion 21 as a virtual image (predetermined picture) formed at a predetermined distance in front of the windshield 18. In this way, the picture displayed by the HUD 20 is superimposed on the real space in front of the vehicle 1 through the windshield 18, and as a result, the occupant can visually recognize a virtual image object I formed by the predetermined picture in a manner in which the virtual image object I floats above a road located outside the vehicle.

Here, the viewpoint E of the occupant may be either a viewpoint of a left eye or a viewpoint of a right eye of the occupant. Alternatively, the viewpoint E may be defined as a midpoint of a line segment that connects the viewpoint of the left eye and the viewpoint of the right eye. A position of the viewpoint E of the occupant is specified, for example, based on the picture data acquired by the internal camera 6B. The position of the viewpoint E of the occupant may be updated at a predetermined period, or may be determined once when the vehicle 1 is started.

When a 2D picture (planar picture) is formed as the virtual image object I, a predetermined picture is projected so as to be a virtual image at a freely determined single distance. When a 3D picture (stereoscopic picture) is formed as the virtual image object I, a plurality of predetermined pictures that are the same as or different from each other are projected so as to be virtual images respectively at different distances. A distance of the virtual image object I (a distance from the viewpoint E of the occupant to the virtual image) can be appropriately adjusted by adjusting a distance from the picture generation apparatus 24 to the viewpoint E of the occupant (for example, adjusting a distance between the picture generation apparatus 24 and the concave mirror 26).

Figure 3:
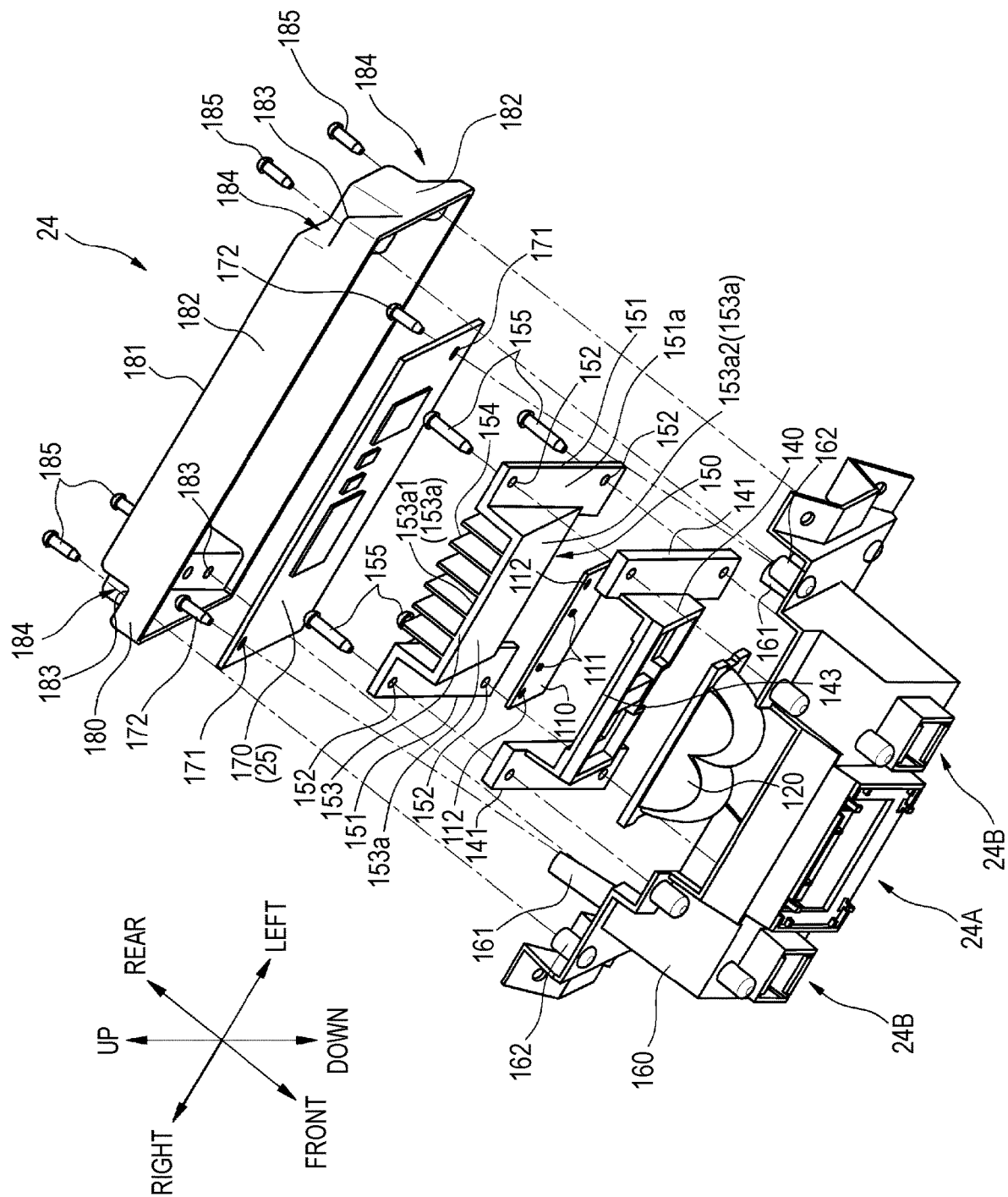
FIG. 3 is an exploded perspective view showing a configuration of a picture generation apparatus included in the HUD in FIG. 2.
Figure 4:
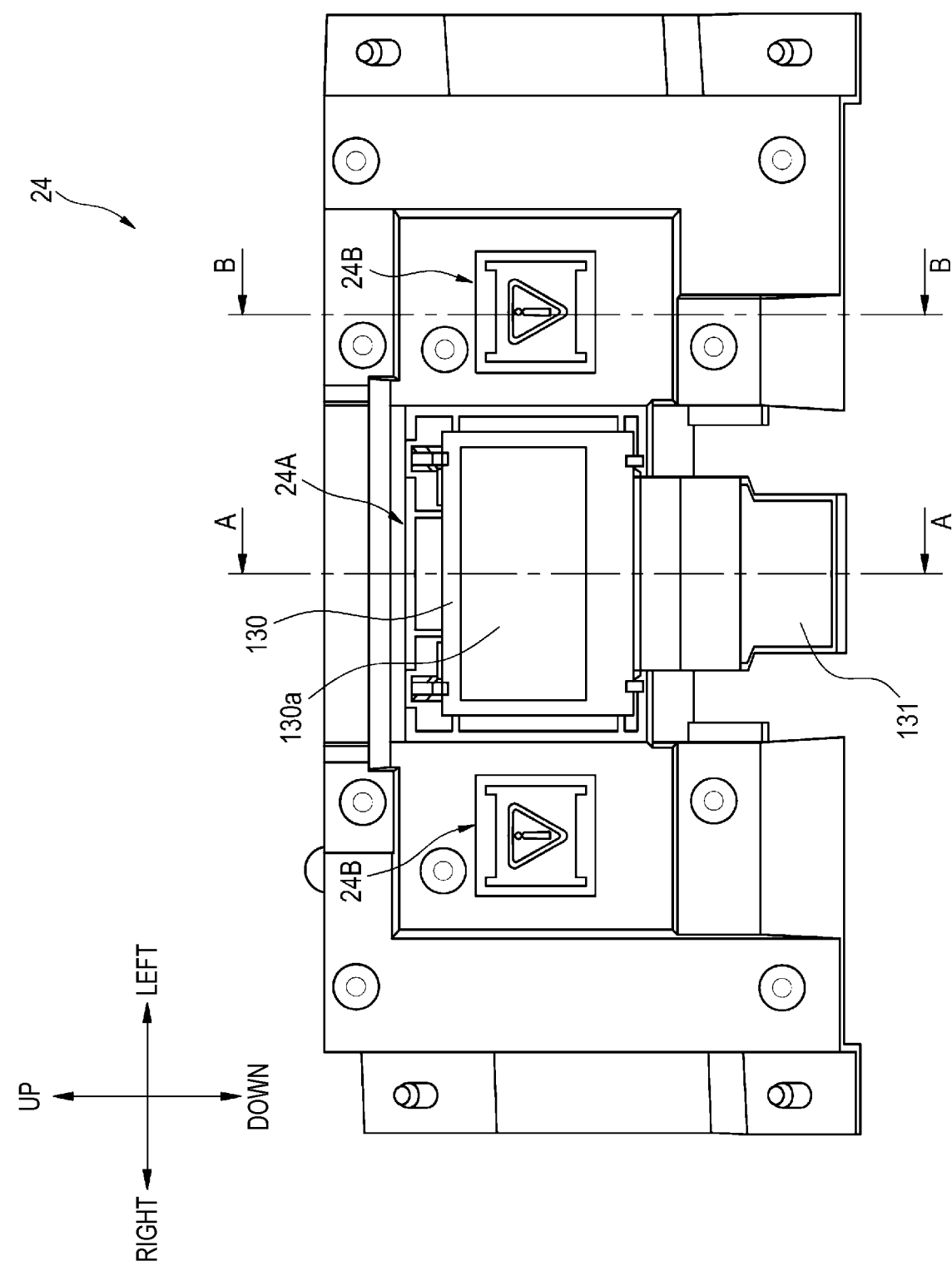
FIG. 4 is a front view of the picture generation apparatus in FIG. 3.

FIG. 3 is an exploded perspective view showing a configuration of the picture generation apparatus 24. FIG. 4 is a front view of the picture generation apparatus 24.

As shown in FIGS. 3 and 4, the picture generation apparatus 24 includes the change picture generation unit 24A disposed at a central portion in the front view, and the fixed picture generation units 24B disposed on both left and right sides of the change picture generation unit 24A. The change picture generation unit 24A and the fixed picture generation units 24B are accommodated in a PGU housing 160. A circuit board 170 on which the control unit 25 is mounted, and a rear surface cover 180 that covers a rear surface of the PGU housing 160 are attached to the PGU housing 160, and the control unit 25 controls the change picture generation unit 24A and the fixed picture generation units 24B.

Figure 5:
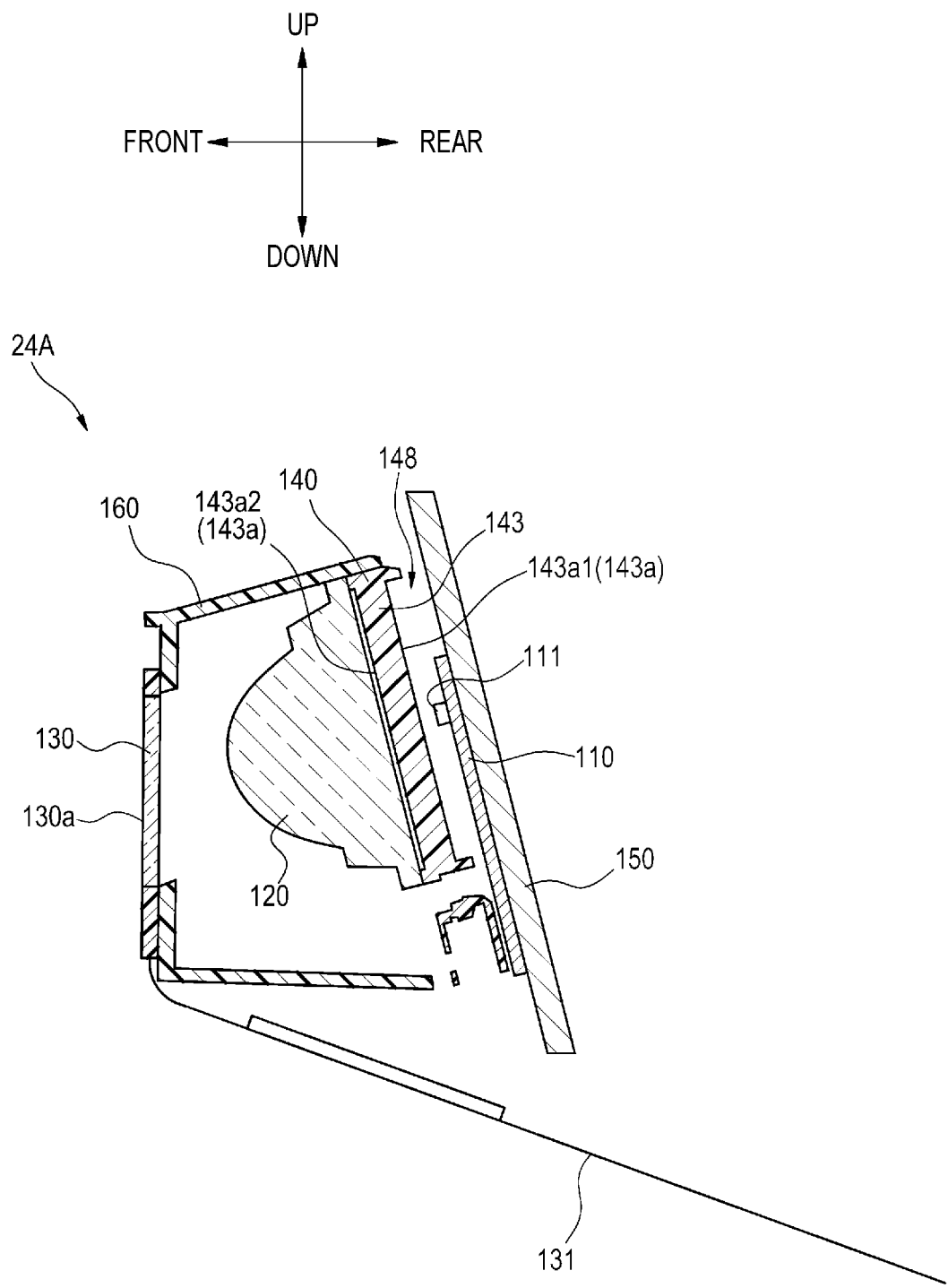
FIG. 5 is a cross-sectional view taken along a line A-A in FIG. 4.

FIG. 5 is a cross-sectional view, taken along a line A-A, of the picture generation apparatus 24 shown in FIG. 4, that is, a cross-sectional view of the change picture generation unit 24A in the picture generation apparatus 24.

As shown in FIGS. 3 to 5, the change picture generation unit 24A includes a light source substrate 110 on which a light source 111 is mounted, a lens 120 (an example of an optical member) disposed on a front side of the light source 111, and a display device 130 disposed on a front side of the lens 120. The change picture generation unit 24A further includes a lens holder 140 disposed on a front side of the light source substrate 110, and a heat sink 150 disposed on a rear side of the light source substrate 110.

The light source 111 is, for example, a laser light source or an LED light source. The laser light source is, for example, an RGB laser light source that emits red laser light, green laser light, and blue laser light. The light source substrate 110 is, for example, a printed circuit board which is made of an insulator and in which a wiring of an electric circuit is printed on a surface or in an inside of the board. On the light source substrate 110, for example, a plurality of (two in the present example) laser light sources are arranged side by side in the left-right direction. Further, the light source substrate 110 is formed with at least one hole portion 112 by which an attachment position of the light source substrate 110 to the lens holder 140 is fixed. In the present embodiment, one hole portion 112 is formed at each of left and right ends of the light source substrate 110.

The lens 120 is implemented by, for example, a plano-convex lens. Instead of using the lens 120, a prism, a diffusion plate, a magnifying glass, or the like may be used. The lens 120 is attached to the lens holder 140. The lens 120 is configured to transmit or reflect light emitted from the light source 111 and emit the light toward the display device 130. In the present embodiment, two plano-convex lenses are provided side by side in the left-right direction correspondingly to the two light sources 111.

The display device 130 is a liquid crystal display, a digital mirror device (DMD), or the like. A drawing method of the change picture generation unit 24A may be a raster scan method, a DLP method, or an LCOS method. When the DLP method or the LCOS method is used, the light source 111 of the change picture generation unit 24A may be the LED light source. When a liquid crystal display method is used, the light source 111 of the change picture generation unit 24A may be a white LED light source. The display device 130 is attached to a front surface portion of the PGU housing 160. The display device 130 is attached to the PGU housing 160 in a state where a light emitting surface 130a faces toward a front of the change picture generation unit 24A, and light for generating a change picture is emitted from the light emitting surface 130a. For example, the display device 130 is configured to be attached to the PGU housing 160 from a front surface side of the PGU housing 160. A flexible printed circuit (FPC) 131 that connects the display device 130 and the control unit 25 is connected to the display device 130. The display device 130 is configured to form, by the light of the light source 111 transmitted through the lens 120, light for generating a predetermined change picture.

Figure 6:
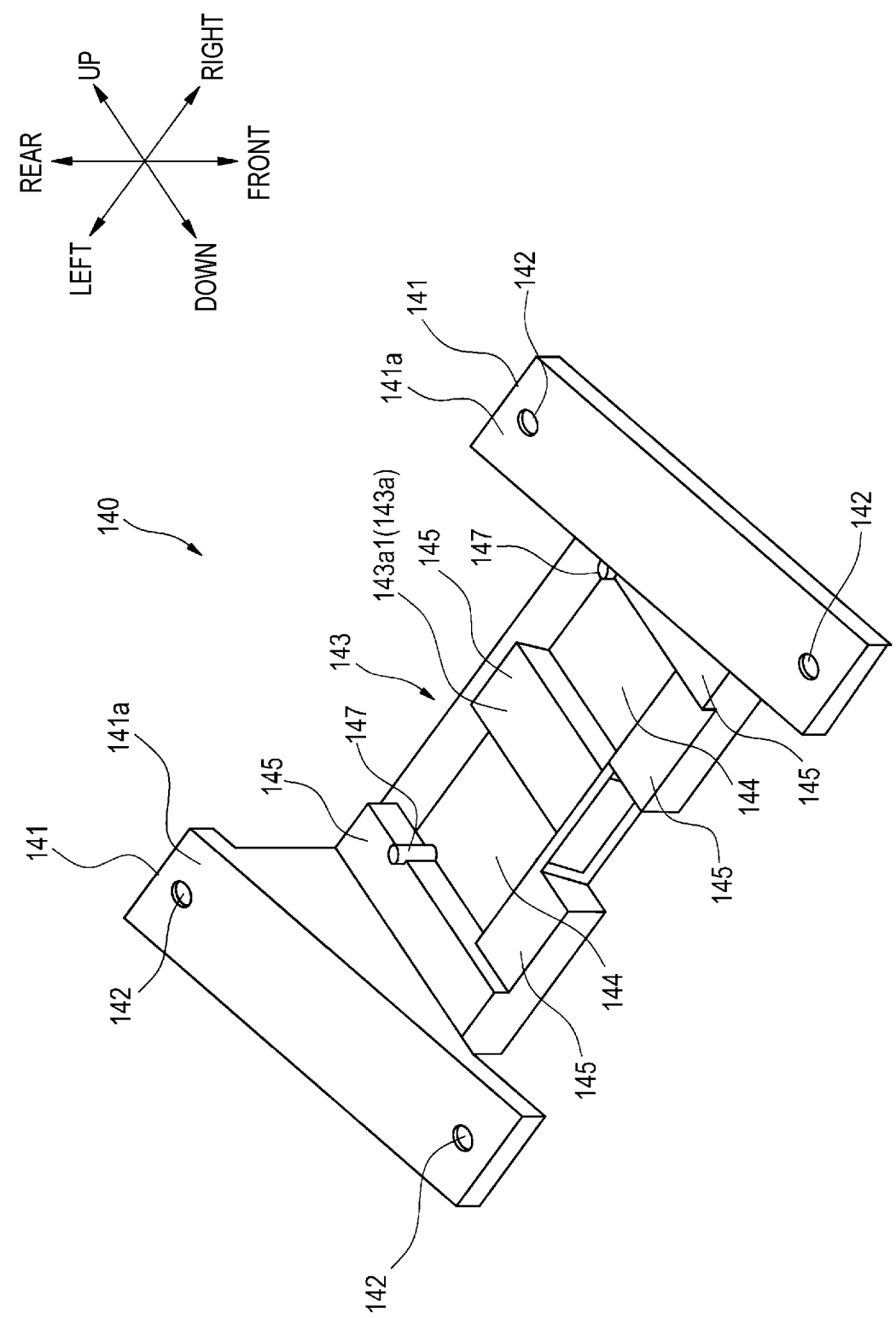
FIG. 6 is a rear perspective view of a lens holder.

FIG. 6 is a rear perspective view of the lens holder 140. As shown in FIGS. 3 to 6, the lens holder 140 includes a pair of holder attachment portions 141 in which a plurality of attachment holes 142 (an example of first engagement portions) are formed, and a fixing recess 143 provided between the pair of holder attachment portions 141.

The holder attachment portions 141 are each formed in, for example, a flat plate shape. Attachment surfaces 141a (an example of first surfaces) of the holder attachment portions 141 each having the flat plate shape are formed so as to be parallel to the light emitting surface 130a of the display device 130 attached to the PGU housing 160. In the present description, "parallel" does not necessarily mean only a completely parallel direction, and includes directions within ±5 degrees relative to the completely parallel direction. In the present embodiment, in each holder attachment portion 141, respective two of the attachment holes 142 of the holder attachment portions 141 are formed side by side in the up-down direction.

The fixing recess 143 is formed in a state of being recessed frontward from the pair of holder attachment portions 141. The fixing recess 143 includes an inclined surface 143a (an example of a second surface) that is inclined with respect to the attachment surfaces 141a of the holder attachment portions 141. The inclined surface 143a is formed such that an upper portion side of the inclined surface 143a is inclined frontward with respect to the attachment surfaces 141a.

The fixing recess 143 is formed with an opening 144 in a central portion, and is formed with frame portions 145 around the opening 144. The opening 144 is formed in such a size and a shape that a peripheral edge of the light source substrate 110 disposed on a rear side of the lens holder 140 overlaps with the frame portions 145 and the light source 111 mounted on the light source substrate 110 is accommodated inside the opening 144. In the present embodiment, two openings 144 are formed in the left-right direction.

An inclined rear surface 143a1 of the inclined surface 143a, which is a rear side of the fixing recess 143, is provided with a pin 147 in the frame portion 145. The pin 147 is provided so as to protrude rearward from the frame portion 145. The pin 147 is provided at a position where the pin 147 can be inserted into the hole portion 112 of the light source substrate 110. In the present example, one pin 147 is provided in each of left and right frame portions 145 of the inclined rear surface 143a1. A height of a protruding portion of the pin 147 protruding rearward from the frame portion 145 is formed so as to be equal to or less than a thickness of the light source substrate 110.

The lens 120 is attached to an inclined front surface 143a2 of the inclined surface 143a which is a front side of the fixing recess 143. The lens 120 attached to the inclined front surface 143a2 is held in the PGU housing 160 in a state of being inclined with respect to the light emitting surface 130a of the display device 130.

Returning to FIG. 3, the heat sink 150 is formed of a member made of aluminum, copper or the like having high heat conductivity. The heat sink 150 is provided so as to be in contact with a back surface of the light source substrate 110 in order to dissipate heat generated from the light source substrate 110. The heat sink 150 includes a pair of heat sink attachment portions 151 in which a plurality of attachment holes 152 (an example of second engagement portions) are formed, and a fixing protrusion 153 provided between the pair of heat sink attachment portions 151.

The heat sink attachment portions 151 are each formed in, for example, a flat plate shape. Attachment surfaces 151a (an example of third surfaces) of the heat sink attachment portions 151 each having the flat plate shape are formed so as to be parallel to the attachment surfaces 141a of the lens holder 140 when the heat sink 150 is attached to the PGU housing 160 together with the lens holder 140. The attachment holes 152 of the heat sink attachment portions 151 are respectively formed at positions corresponding to the attachment holes 142 formed in the attachment surfaces 141a of the lens holder 140. In the present embodiment, two attachment holes 152 arranged side by side in the up-down direction are formed in each of the pair of heat sink attachment portions 151.

The fixing protrusion 153 is formed in a state of protruding frontward from the pair of heat sink attachment portions 151. The fixing protrusion 153 includes an inclined surface 153a (an example of a fourth surface) that is inclined with respect to the attachment surfaces 151a of the heat sink attachment portions 151. The inclined surface 153a is formed such that an upper portion side of the inclined surface 153a is inclined frontward with respect to the attachment surfaces 151a. The inclined surface 153a is formed so as to be parallel to the inclined surface 143a of the lens holder 140.

A plurality of heat dissipation fins 154 are formed on an inclined rear surface 153a1 of the inclined surface 153a which is a rear side of the fixing protrusion 153. An inclined front surface 153a2 of the inclined surface 153a which is a front side of the fixing protrusion 153 is formed in a planar shape as a surface in contact with the light source substrate 110.

The heat sink 150 is screwed to the PGU housing 160 by attachment screws 155 screwed through the attachment holes 152 of the heat sink attachment portions 151. The lens holder 140 is screwed to the PGU housing 160 by the attachment screws 155 screwed through the attachment holes 142 of the attachment surfaces 141a. The heat sink 150 and the lens holder 140 are screwed to the PGU housing 160 by the common attachment screws 155 in a state where the fixing protrusion 153 is fitted into the fixing recess 143 of the lens holder 140 and the attachment surfaces 151a of the heat sink attachment portions 151 respectively face the attachment surfaces 141a of the holder attachment portions 141 of the lens holder 140.

Figure 7:
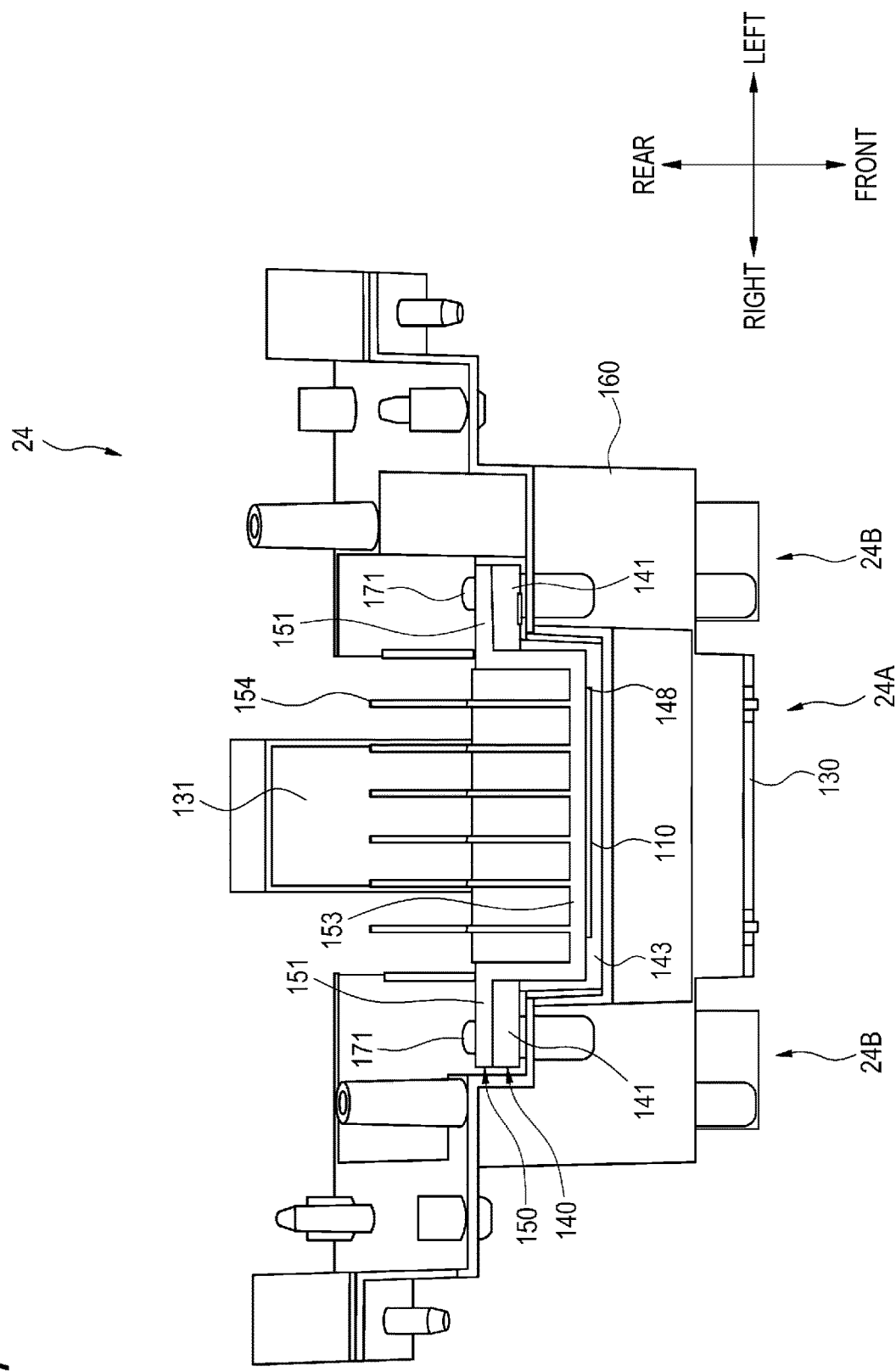
FIG. 7 is a top view of the picture generation apparatus in FIG. 3.

FIG. 7 is a top view of the picture generation apparatus 24. FIG. 7 shows a state where members of the picture generation apparatus 24 shown in FIG. 3 are combined.

As shown in FIGS. 3, 6, and 7, the light source substrate 110 is attached to the PGU housing 160 in a state of being interposed between the inclined rear surface 143a1 of the fixing recess 143 of the lens holder 140 and the inclined front surface 153a2 of the fixing protrusion 153 of the heat sink 150. That is, the light source substrate 110 is attached to inner sides of the pair of holder attachment portions 141 of the lens holder 140 and the pair of heat sink attachment portions 151 of the heat sink 150 in the left-right direction of the lens holder 140 and the heat sink 150.

A depth of the fixing recess 143 of the lens holder 140 is formed to be deeper than a height of the fixing protrusion 153 of the heat sink 150. Specifically, the depth of the fixing recess 143 is formed to be deeper than the height of the fixing protrusion 153 by about the thickness of the light source substrate 110. Therefore, when the fixing protrusion 153 of the heat sink 150 is fitted into the fixing recess 143 of the lens holder 140, a space 148 having about the thickness of the light source substrate 110 is formed between the inclined rear surface 143a1 of the lens holder 140 and the inclined front surface 153a2 of the heat sink 150 (see FIGS. 5 and 7). The light source substrate 110 is accommodated in the space 148 formed between the fixing recess 143 of the lens holder 140 and the fixing protrusion 153 of the heat sink 150. Specifically, the light source substrate 110 is disposed on the frame portions 145 of the fixing recess 143, and is accommodated in the space 148 in a state where the pin 147 provided in each of the frame portions 145 is inserted into the hole portion 112 of the light source substrate 110.

The light source substrate 110 is accommodated in the space 148, so that movement of the light source substrate 110 in the left-right direction and the up-down direction is restricted by the pin 147 inserted into the hole portion 112. Furthermore, the light source substrate 110 is accommodated in the space 148, so that movement of the light source substrate 110 in the front-rear direction is restricted by the fixing recess 143 of the lens holder 140 and the fixing protrusion 153 of the heat sink 150. In this way, the light source substrate 110 is accommodated in the space 148, so that a position of the light source substrate 110 with respect to the lens 120 and the display device 130 is fixed. The light source substrate 110 is accommodated in the space 148, so that the light source 111 mounted on the light source substrate 110 is disposed in the opening 144 of the fixing recess 143.

The light source substrate 110 is attached to the PGU housing 160 so as to be parallel to the inclined surface 143a of the fixing recess 143 of the lens holder 140 and the inclined surface 153a of the fixing protrusion 153 of the heat sink 150, that is, in a state of being inclined by a predetermined angle with respect to the light emitting surface 130a of the display device 130 attached to the PGU housing 160. Similarly to the light source substrate 110, the lens 120 disposed on the front side of the light source substrate 110 is also attached to the PGU housing 160 in a state of being inclined by a predetermined angle with respect to the light emitting surface 130a of the display device 130.

Figure 8:
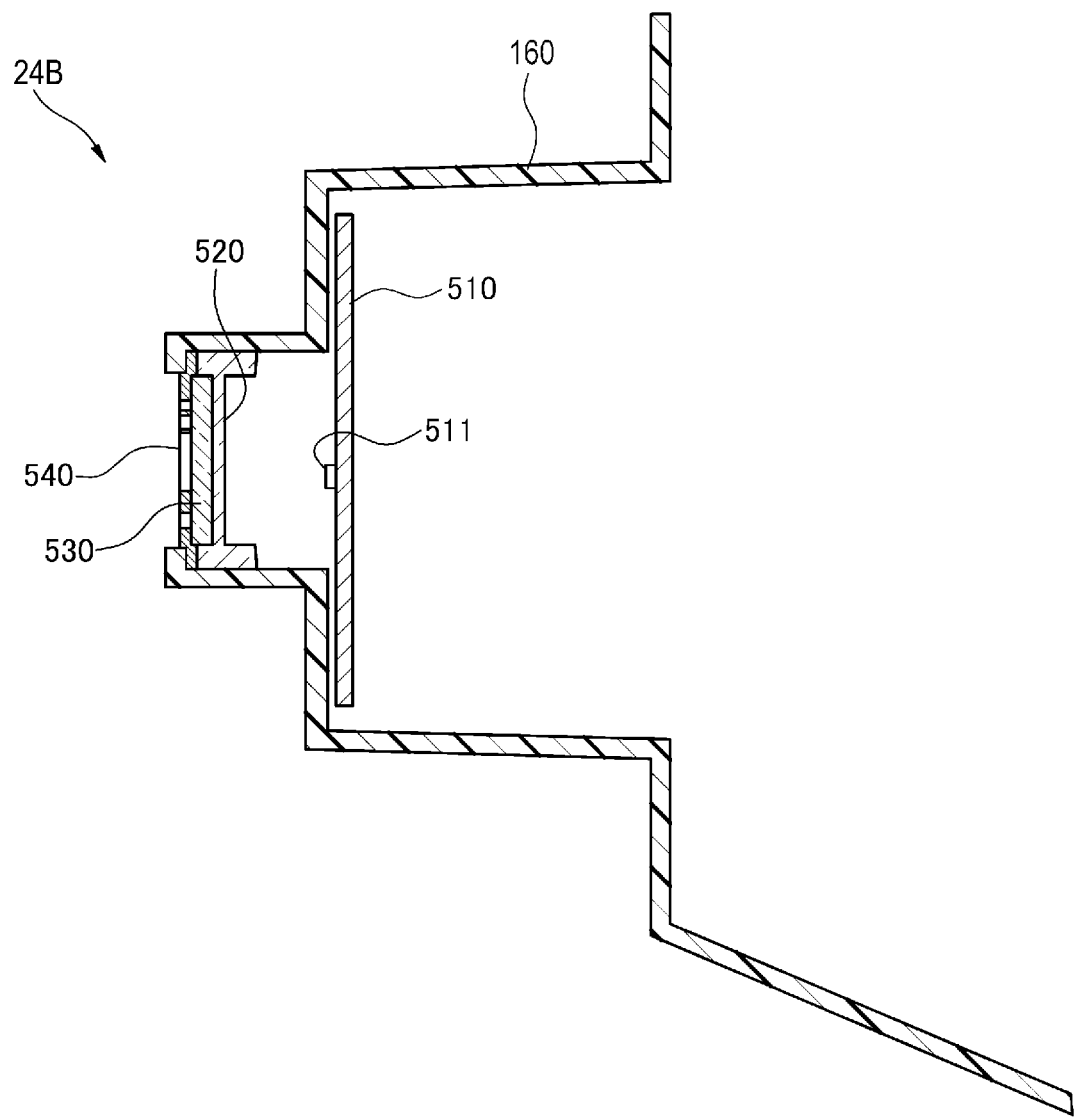
FIG. 8 is a cross-sectional view taken along a line B-B in FIG. 4.

FIG. 8 is a cross-sectional view, taken along a line B-B, of the picture generation apparatus 24 shown in FIG. 4, that is, a cross-sectional view of the fixed picture generation unit 24B in the picture generation apparatus 24.

As shown in FIG. 8, the fixed picture generation unit 24B includes a light source substrate 510 on which a light source 511 is mounted, a lens 520 disposed on a front side of the light source 511, a diffusion plate 530 disposed on a front side of the lens 520, and a light shielding member 540 disposed on a front side of the diffusion plate 530.

Similarly to the above light source 111, the light source 511 is, for example, a laser light source or an LED light source. The light source substrate 510 is, for example, a printed circuit board which is made of an insulator and in which a wiring of an electric circuit is printed on a surface or in an inside of the board. The lens 520 is formed in such a predetermined shape that utilization efficiency of light emitted from the light source 511 can be improved. The lens 520 is configured to transmit or reflect the light emitted from the light source 511 and uniformly emit the light toward the diffusion plate 530. Instead of using the lens 520, at least one of a prism, a diffusion plate, a magnifying glass, a reflector, and the like may be used. The diffusion plate 530 is, for example, formed such that a fine step for light diffusion is provided on a front surface of a synthetic resin film. Alternatively, the diffusion plate 530 may be implemented by, for example, a film to which a light diffusion agent for diffusing light is added. The light shielding member 540 includes, for example, a synthetic resin film and a light shielding film (shade) formed on at least one surface of the synthetic resin film.

The diffusion plate 530 is attached to the PGU housing 160 so as to be parallel to the light emitting surface 130a of the display device 130 attached to the PGU housing 160. Furthermore, the diffusion plate 530 is attached to the PGU housing 160 so as to be arranged side by side with the light emitting surface 130a of the display device 130 attached to the PGU housing 160. In the present embodiment, the diffusion plate 530 is attached to the PGU housing 160 so as to be arranged side by side with the light emitting surface 130a of the display device 130 in the left-right direction.

As shown in FIG. 3, the circuit board 170 of the picture generation apparatus 24 is attached to the PGU housing 160 so as to be disposed between the heat sink 150 and the rear surface cover 180. The circuit board 170 is formed with a plurality of attachment holes 171 by which the circuit board 170 is attached to the PGU housing 160. In the present embodiment, one attachment hole 171 is formed in each of two diagonally facing corner portions of the circuit board 170 having a rectangular shape. The PGU housing 160 is formed with bosses 161 to which the circuit board 170 is attached. The bosses 161 are each formed so as to protrude toward a rear of the PGU housing 160. The circuit board 170 is screwed to the bosses 161 of the PGU housing 160 by attachment screws 172 screwed through the attachment holes 171.

The bosses 161 are formed so as to be perpendicular to the inclined surface 153a of the fixing protrusion 153 of the heat sink 150 attached to the PGU housing 160. Therefore, the circuit board 170 attached to the bosses 161 is attached to the PGU housing 160 so as to be parallel to the inclined surface 153a of the fixing protrusion 153 of the heat sink 150, that is, in a state of being inclined with respect to the attachment surfaces 151a of the heat sink attachment portions 151 of the heat sink 150. As a result, the circuit board 170 is attached at a predetermined interval from the heat dissipation fins 154 formed on the inclined rear surface 153a1 of the fixing protrusion 153, so as not to be in contact with the fins 154. The circuit board 170 is connected to the change picture generation unit 24A and the fixed picture generation units 24B via the FPC 131. The display device 130, the light source substrates 110 and 510, and the like are controlled by the control unit 25 mounted on the circuit board 170.

As shown in FIG. 3, the rear surface cover 180 of the picture generation apparatus 24 is attached to the PGU housing 160 so as to cover a rear surface of the circuit board 170 in a state where the circuit board 170 is attached to a rear side of the heat sink 150. The rear surface cover 180 includes a rear surface portion 181 and a side surface portion 182 that rises frontward from the rear surface portion 181.

The rear surface portion 181 is formed with attachment holes 183 (an example of an engagement hole) by which the rear surface cover 180 is attached to the PGU housing 160. Areas of the rear surface portion 181 in which the attachment holes 183 are respectively formed are formed to be recesses 184, and each of the recesses 184 is more recessed, than other areas of the rear surface portion 181, in a direction (frontward direction) in which the rear surface cover 180 is attached to the PGU housing 160. In the present embodiment, the recesses 184 are formed at four corner portions of the rear surface portion 181 having a rectangular shape, respectively. The PGU housing 160 is formed with bosses 162 to which the rear surface cover 180 is attached. The bosses 162 are each formed so as to protrude from the PGU housing 160 toward the rear surface cover 180 (toward the rear). The rear surface cover 180 is screwed to the bosses 162 of the PGU housing 160 by attachment screws 185 screwed through the attachment holes 183.

The bosses 162 are formed so as to be perpendicular to the attachment surfaces 151a of the heat sink attachment portions 151 of the heat sink 150 attached to the PGU housing 160. Each of areas of the rear surface portion 181 of the rear surface cover 180 in which the recesses 184 are formed is formed so as to be parallel to the attachment surfaces 151a of the heat sink attachment portions 151 of the heat sink 150 when the rear surface cover 180 is attached to the PGU housing 160. In contrast, an area of the rear surface portion 181 of the rear surface cover 180 other than the recesses 184, that is, an area other than the four corner portions of the rear surface portion 181 in the present embodiment is formed so as to be parallel to the inclined surface 153a of the fixing protrusion 153 of the heat sink 150 when the rear surface cover 180 is attached to the PGU housing 160.

Therefore, when the rear surface cover 180 is attached to the PGU housing 160, the areas of the rear surface portion 181 in which the recesses 184 are formed are screwed to the bosses 162 of the PGU housing 160 at an orientation orthogonal to the bosses 162. On the other hand, the area of the rear surface portion 181 of the rear surface cover 180 other than the recesses 184 is attached so as to be parallel to the rear surface of the circuit board 170 when the rear surface cover 180 is attached to the PGU housing 160.

As described above, the picture generation apparatus 24 according to the present embodiment includes: the light source substrate 110 on which the light source 111 is mounted; the lens 120 through which the light emitted from the light source 111 is transmitted; the display device 130 that forms, by the light transmitted through the lens 120, the light for generating the predetermined picture; the heat sink 150 that dissipates the heat generated from the light source substrate 110; and the lens holder 140 that holds the lens 120. The lens holder 140 includes the plurality of attachment holes 142 (first engagement portions), and the heat sink 150 includes the plurality of attachment holes 152 (second engagement portions) that are respectively provided at the positions corresponding to the plurality of attachment holes 142. Each of the plurality of attachment holes 142 and a respective one of the plurality of attachment holes 152 are fixed to each other, so that the light source substrate 110 is positioned and fixed in the state of being interposed between the lens holder 140 and the heat sink 150 and being accommodated in the space 148 that is formed among the plurality of attachment holes 142. According to the configuration, it is not necessary to form attachment holes in the light source substrate 110 as compared with a case where the same attachment holes as the attachment holes 142 and 152 formed in the lens holder 140 and the heat sink 150 are formed in the light source substrate 110, and these attachment holes are together fixed. Therefore, a size of the light source substrate 110 can be reduced, and manufacturing cost of the light source substrate 110 in the picture generation apparatus 24 can be reduced.

In the picture generation apparatus 24, the lens holder 140 includes: the pair of attachment surfaces 141a parallel to the light emitting surface 130a of the display device 130; and the inclined surface 143a formed between the pair of attachment surfaces 141a and inclined with respect to the pair of attachment surfaces 141a. The attachment holes 142 are provided in the pair of attachment surfaces 141a. The inclined surface 143a is provided with the opening 144 and the frame portion 145 that surrounds a periphery of the opening 144. The light source substrate 110 is attached to the frame portion 145 so that the light source 111 is disposed in the opening 144. According to the configuration, a light emitting surface of the light source 111 is inclined with respect to the light emitting surface 130a of the display device 130. Therefore, external light can be prevented from being reflected by the light emitting surface 130a of the display device 130 and becoming stray light, and the external light can be prevented from adversely affecting the virtual image. Further, reflected light of the light emitted from the light source 111 can be prevented from being directly incident on the light source 111. When the light source substrate 110 is interposed and fixed between the lens holder 140 and the heat sink 150 as in the configuration, the picture generation apparatus 24 can be easily assembled in a state where the light emitting surface of the light source 111 is inclined with respect to the light emitting surface 130a of the display device 130.

In the picture generation apparatus 24, the light source substrate 110 includes the at least one hole portion 112, and the at least one pin 147 insertable into the at least one hole portion 112 protrudes from the frame portion 145. Therefore, the light source substrate 110 can be accurately positioned with a simple configuration in which the light source substrate 110 is interposed between the lens holder 140 and the heat sink 150 and the at least one pin 147 is inserted into the at least one hole portion 112.

In the picture generation apparatus 24, the heat sink 150 includes: the pair of attachment surfaces 151a which are surfaces parallel to the pair of attachment surfaces 141a of the lens holder 140 and in which the plurality of attachment holes 152 are formed; and the inclined surface 153a which is formed between the pair of attachment surfaces 151a and is parallel to the inclined surface 143a of the lens holder 140. The light source substrate 110 is accommodated in the space 148 formed between the inclined surface 143a and the inclined surface 153a. As described above, the heat sink 150 includes the attachment surfaces 151a and the inclined surface 153a which have different inclinations, and thus the light source substrate 110, which needs to have an inclination different from that of the light emitting surface 130a of the display device 130, can be stably held, with the different inclination, between the lens holder 140 and the heat sink 150.

The picture generation apparatus 24 further includes the PGU housing 160 to which the display device 130 is mountable. The lens holder 140 and the heat sink 150 are attached to the PGU housing 160 by the attachment screws 155 screwed through the plurality of attachment holes 142 and the plurality of attachment holes 152. Therefore, with a simple configuration, the light source substrate 110 reduced in size can be interposed and fixed between the lens holder 140 and the heat sink 150.

The picture generation apparatus 24 further includes the circuit board 170 that controls at least the display device 130, and the rear surface cover 180 that covers the rear surface of the PGU housing 160. The rear surface cover 180 is attached to the PGU housing 160 in a state where the circuit board 170 is attached to the PGU housing 160 such that the circuit board 170 is disposed between the heat sink 150 and the rear surface cover 180. As a result, the circuit board 170 on which a circuit is mounted can also be included as a unit, and the circuit controls the display device 130. Therefore, assembling workability can be improved as compared with a case where the picture generation apparatus 24 and the circuit board 170 are separately assembled to the HUD main body portion 21. By assembling and fixing the circuit board 170 to the PGU housing 160 in advance, connection work of the FPC 131 that connects the circuit board 170 and the display device 130 becomes easy. Furthermore, a length of the FPC 131 can be shortened as compared with the case where the picture generation apparatus 24 and the circuit board 170 are separately assembled to the HUD main body portion 21, which leads to cost reduction.

In the picture generation apparatus 24, the rear surface cover 180 includes the rear surface portion 181 and the side surface portion 182 that rises from the rear surface portion 181, and the rear surface portion 181 is formed with at least one attachment hole 183 that is screwable to the boss 162 protruding from the PGU housing 160 toward the rear surface cover 180. The area in which the at least one attachment hole 183 is formed is more recessed, than other areas of the rear surface portion 181, in the direction in which the rear surface cover 180 is attached to the PGU housing 160. Therefore, a distance from the boss 162 of the PGU housing 160 to the area in which the attachment hole 183 of the rear surface cover 180 is formed can be reduced, and a length of each of the attachment screw 185 and the boss 162 by which the PGU housing 160 is attached to the rear surface cover 180 can be shortened as much as possible.

Furthermore, in the picture generation apparatus 24, the light source substrate 110 of the change picture generation unit 24A is disposed so as to be inclined by a predetermined angle with respect to the light emitting surface 130a (an example of a first light emitting surface) of the display device 130. The diffusion plate 530 (an example of a second light emitting surface) of the fixed picture generation unit 24B is a surface parallel to the light emitting surface 130a. According to the configuration, it is possible to properly generate the fixed picture which is generated by the fixed picture generation unit 24B and is to be added to the change picture generated by the change picture generation unit 24A. Therefore, a display range of a picture can be enlarged by adding the picture generated by the fixed picture generation unit 24B without increasing a size of the high-cost change picture generation unit 24A. Furthermore, since the light source substrate 110 is disposed such that the light emitting surface of the light source 111 is inclined with respect to the light emitting surface 130a of the display device 130, the external light or the light emitted from the light source 111 can be prevented from being reflected by the display device 130 and the reflected light can be prevented from adversely affecting generation of the picture.

Incidentally, when the light emitting surfaces of the change picture generation unit 24A and the fixed picture generation unit 24B are not parallel to each other, it is necessary to provide a step portion on a concave mirror to adjust a reflective surface, and a vapor deposition process of forming a reflective film by vapor-depositing aluminum or the like on the concave mirror may become complicated. In contrast, according to the picture generation apparatus 24 of the present embodiment, the light emitting surface 130a of the change picture generation unit 24A and the diffusion plate 530 that is the light emitting surface of the fixed picture generation unit 24B are parallel to each other, and thus the concave mirror 26 can be formed as a single continuous surface without having a complicated configuration. As a result, the vapor deposition process can be simplified.

In the picture generation apparatus 24, the diffusion plate 530 of the fixed picture generation unit 24B is attached to the PGU housing 160 so as to be arranged side by side with the light emitting surface 130a of the display device 130 of the change picture generation unit 24A attached to the PGU housing 160. Therefore, the light emitting surface 130a of the display device 130 of the change picture generation unit 24A and the diffusion plate 530 of the fixed picture generation unit 24B can be kept parallel to each other with a simple configuration.

The HUD 20 according to the present embodiment includes the picture generation apparatus 24 having the above configuration, and the at least one concave mirror 26 (an example of a reflection unit) that reflects the light emitted by the picture generation apparatus 24 such that the light is emitted to the windshield 18. Therefore, manufacturing cost of the picture generation apparatus 24 in the HUD 20 can be reduced. Furthermore, it is possible to provide the HUD 20 capable of enlarging the display range of the picture at low cost and capable of preventing the external light or the reflected light from adversely affecting generation of the virtual image.

Second Embodiment

Figure 9:
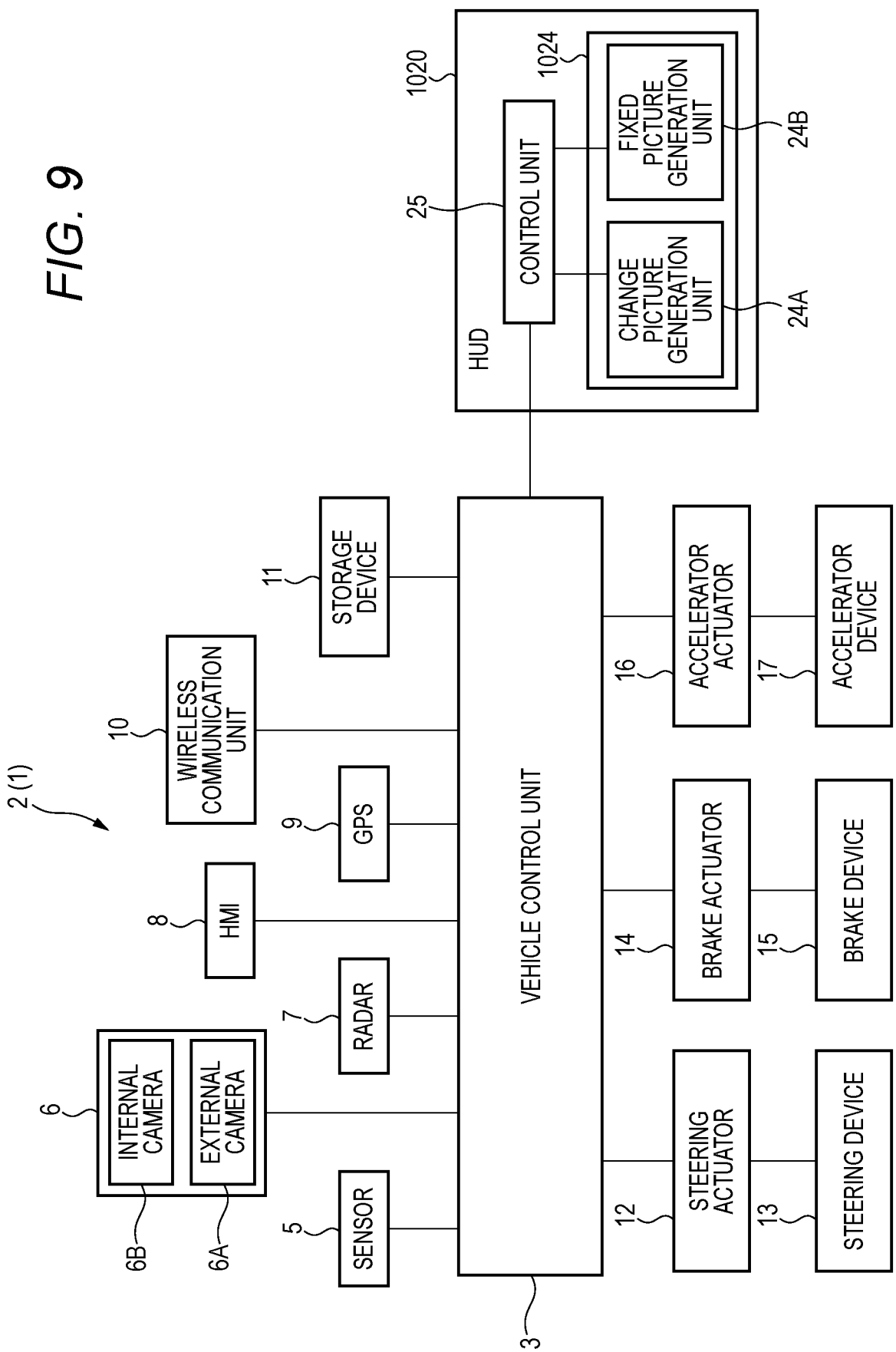
FIG. 9 is a block diagram of a vehicle system including an HUD according to a second embodiment.
Figure 10:
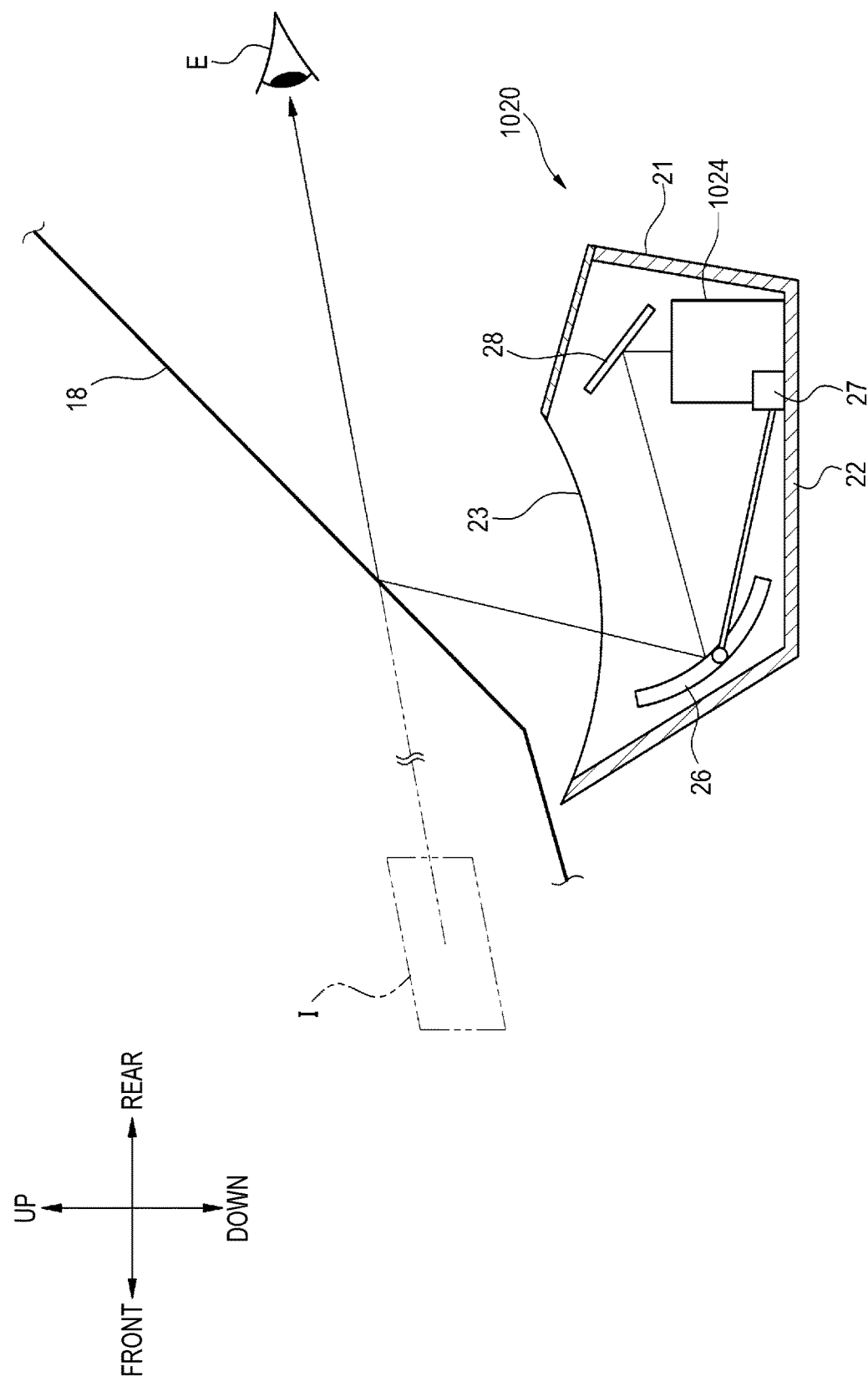
FIG. 10 is a schematic diagram showing a configuration of the HUD according to the second embodiment.

Hereinafter, an HUD according to a second embodiment will be described with reference to FIGS. 9 to 19. FIG. 9 is a block diagram of a vehicle system including the HUD according to the second embodiment. FIG. 10 is a schematic diagram showing a configuration of the HUD according to the second embodiment. In the second embodiment, the same components as those in the first embodiment are denoted by the same reference numerals, and descriptions thereof are omitted.

As shown in FIG. 9, an HUD 1020 includes a picture generation apparatus 1024 and the control unit 25. The picture generation apparatus 1024 includes the change picture generation unit 24A and the fixed picture generation unit 24B. In the HUD 1020 according to the second embodiment, the picture generation apparatus 1024 and the control unit 25 are provided separately, but the control unit 25 may be provided in the picture generation apparatus 1024 similarly to the HUD 20 (FIG. 1) according to the first embodiment.

As shown in FIG. 10, the HUD 1020 includes the HUD main body portion 21. The HUD main body portion 21 includes the main body housing 22 and the emitting window 23. The emitting window 23 is formed of the transparent plate through which the visible light is transmitted. The HUD main body portion 21 includes, inside the main body housing 22, the picture generation apparatus 1024 (an example of a picture generation unit), the concave mirror 26 (an example of a reflector), the rotation mechanism 27 that rotates the concave mirror 26, and a plane mirror 28.

The picture generation apparatus 1024 is provided in the main body housing 22 so as to emit light upward. The plane mirror 28 is disposed on an optical path of the light emitted from the picture generation apparatus 1024. Specifically, the plane mirror 28 is disposed above the picture generation apparatus 1024, and is configured to reflect, toward the concave mirror 26, the light emitted from the picture generation apparatus 1024.

The concave mirror 26 is disposed on an optical path of the light that is emitted from the picture generation apparatus 1024 and then reflected by the plane mirror 28. Specifically, the concave mirror 26 is disposed on a front side of the picture generation apparatus 1024 and the plane mirror 28 in the main body housing 22. The concave mirror 26 is configured to reflect, toward the windshield 18 (for example, the front window of the vehicle 1), the light emitted from the picture generation apparatus 1024. The concave mirror 26 includes the reflective surface that is curved into the concave shape in order to form the predetermined picture, and reflects, at a predetermined magnification, a picture of the light that is emitted from the picture generation apparatus 1024 and is used to form the picture.

The rotation mechanism 27 is configured such that the orientation of the concave mirror 26 can be changed by rotating the concave mirror 26. The rotation mechanism 27 is accommodated in the main body housing 22 so as to be arranged side by side with the picture generation apparatus 1024 in the left-right direction. A detailed configuration of the main body housing 22 will be described later with reference to FIGS. 17 to 19. The rotation mechanism 27 is connected to the control unit 25 (see FIG. 9), and rotates the concave mirror 26 based on a control signal transmitted from the control unit 25. The rotation mechanism 27 may be connected to a control unit outside the HUD main body portion 21. A position of the concave mirror 26 may be changed by the rotation mechanism 27 or another member.

The light emitted from the picture generation apparatus 1024 is reflected by the plane mirror 28 and the concave mirror 26 and is then emitted from the emitting window 23 of the HUD main body portion 21. The light emitted from the emitting window 23 of the HUD main body portion 21 is emitted to the windshield 18. A part of the light emitted from the emitting window 23 to the windshield 18 is reflected toward the viewpoint E of the occupant. As a result, the occupant recognizes the light emitted from the HUD main body portion 21 as a virtual image (predetermined picture) formed at a predetermined distance in front of the windshield 18. In this way, the picture displayed by the HUD 1020 is superimposed on the real space in front of the vehicle 1 through the windshield 18, and as a result, the occupant can visually recognize the virtual image object I formed by the predetermined picture in a manner in which the virtual image object I floats above a road located outside the vehicle 1.

Figure 11:
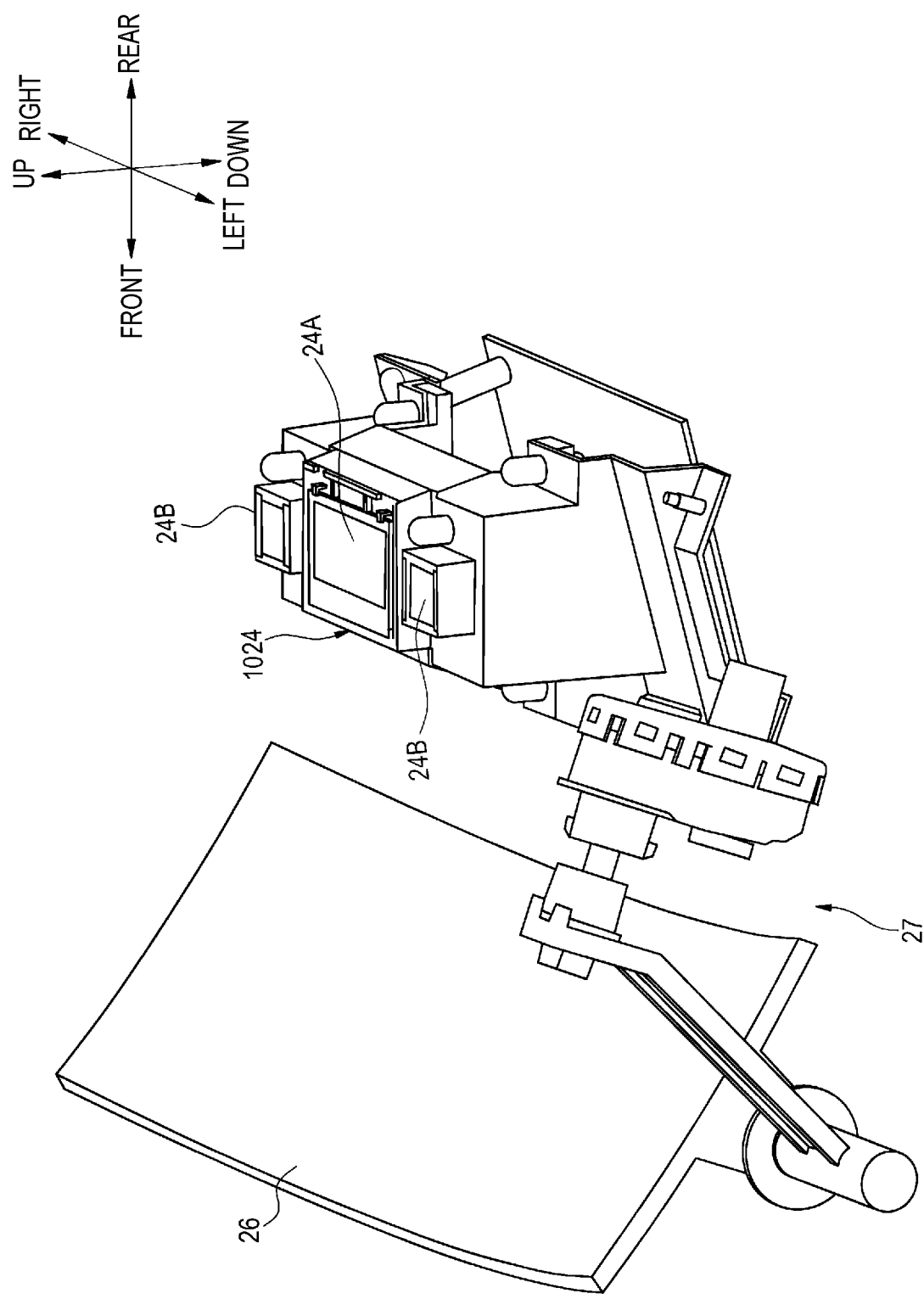
FIG. 11 is a perspective view showing a reflector, a picture generation apparatus, and a rotation mechanism according to the second embodiment.
Figure 12:
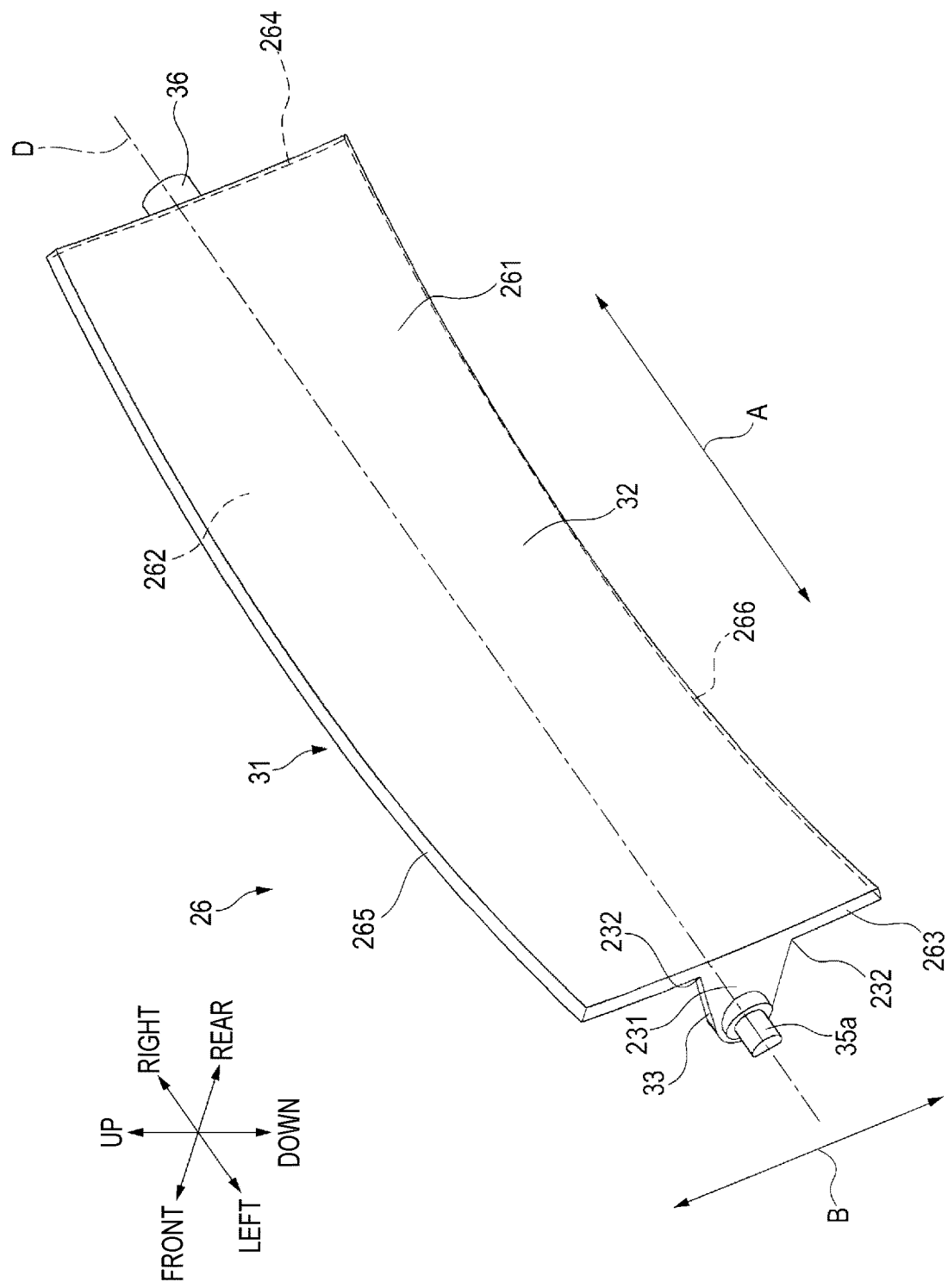
FIG. 12 is a perspective view of the reflector in FIG. 11.
Figure 13:
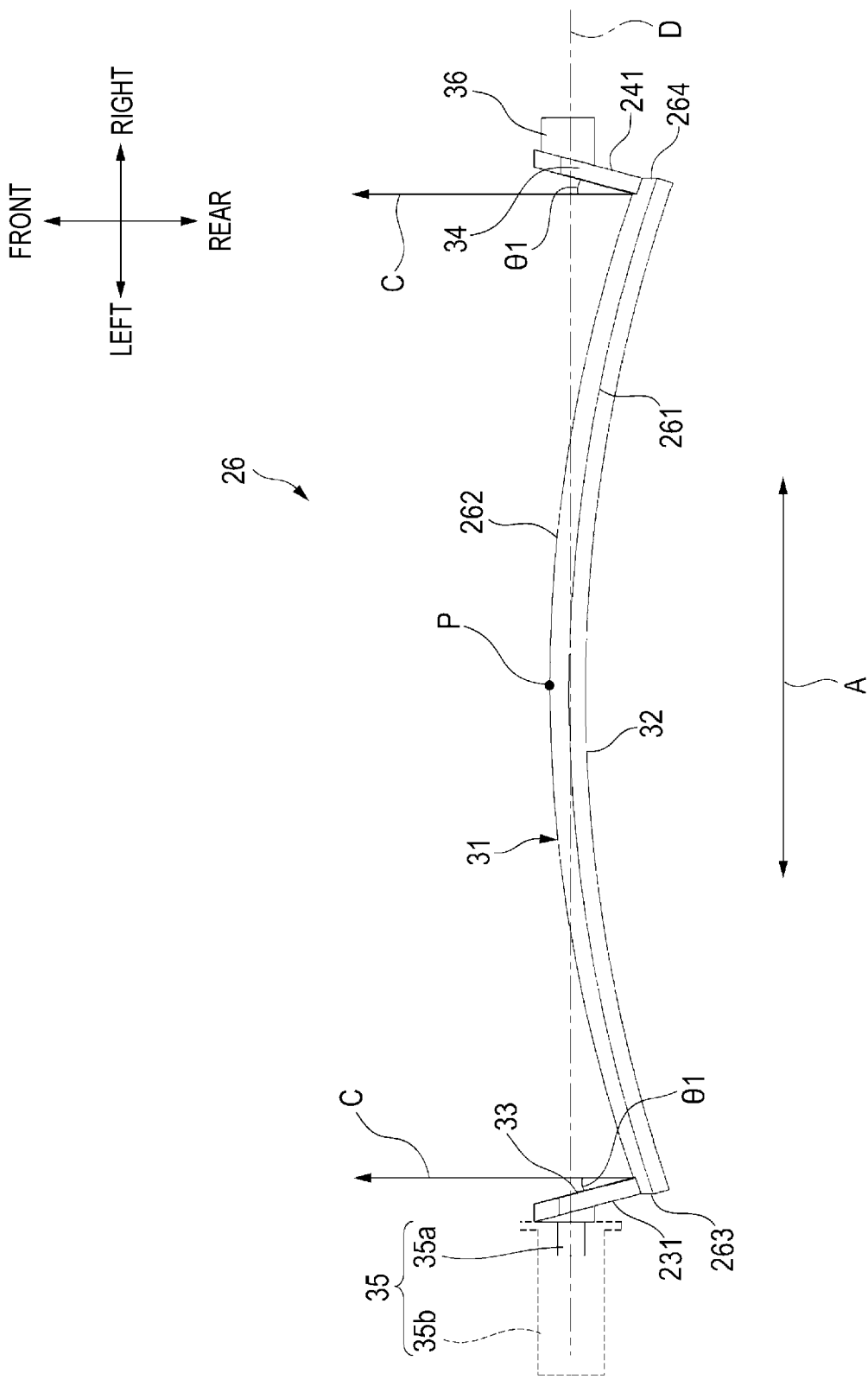
FIG. 13 is a top view of the reflector.
Figure 14:
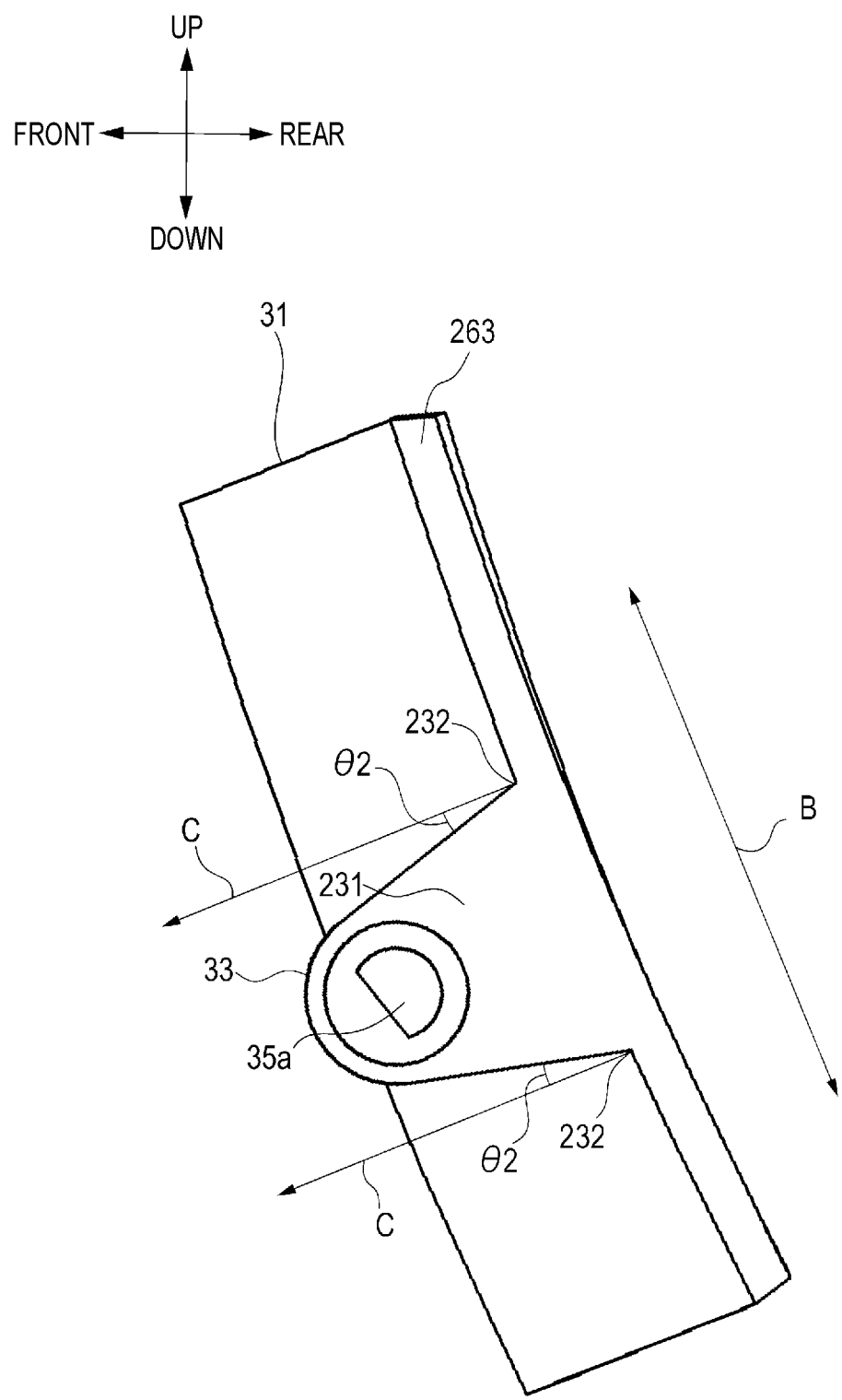
FIG. 14 is a side view of the reflector.

FIG. 11 is a perspective view showing the picture generation apparatus 1024, the concave mirror 26, and the rotation mechanism 27 in a state where the main body housing 22 of the HUD 1020 is removed. In FIG. 11, the plane mirror 28 is not shown. FIG. 12 is a perspective view of the concave mirror 26 when viewed from a front surface (reflective surface) side. FIG. 13 is a top view of the concave mirror 26. FIG. 14 is a left side view of the concave mirror 26.

As shown in FIG. 11, the picture generation apparatus 1024 of the present example includes the change picture generation unit 24A, and the pair of fixed picture generation units 24B and 24B arranged side by side in the left-right direction with the change picture generation unit 24A interposed therebetween. The light emitting surface of the change picture generation unit 24A, and the light emitting surfaces of the pair of fixed picture generation units 24B and 24B are disposed upward so as to emit the light to the plane mirror 28 (see FIG. 10) disposed above the picture generation apparatus 1024.

As shown in FIGS. 11 to 14, the concave mirror 26 is rotatable about a rotation axis D extending in the left-right direction. The concave mirror 26 includes a main body portion 31, a first protruding portion 33, a second protruding portion 34, a first shaft portion 35, and a second shaft portion 36. The main body portion 31 is formed in a plate shape. In the present embodiment, the main body portion 31 is formed in, for example, a horizontally long rectangular plate shape. The main body portion 31 is made of, for example, a resin such as polycarbonate. The main body portion 31 includes a first surface 261 (an example of a reflective surface) on which a reflective film 32 is formed, and a second surface 262 on a side opposite to the first surface 261 (a back surface side of the main body portion 31). The first surface 261 is formed in a concave shape, and the second surface 262 is formed in a convex shape. The concave mirror 26 is disposed such that the first surface 261 having the concave shape faces the picture generation apparatus 1024 and the plane mirror 28.

The main body portion 31 includes four surfaces, that is, a first end surface 263, a second end surface 264, a third end surface 265, and a fourth end surface 266, between the first surface 261 and the second surface 262. The second end surface 264 is located on a side opposite to the first end surface 263 with respect to the first surface 261. The fourth end surface 266 is located on a side opposite to the third end surface 265 with respect to the first surface 261. Each of the first end surface 263 to the fourth end surface 266 is formed such that an area thereof is smaller than an area of the first surface 261. Each of the first end surface 263 and the second end surface 264 is formed such that an area thereof is smaller than areas of the third end surface 265 and the fourth end surface 266. That is, the third end surface 265 and the fourth end surface 266 constitute end surfaces, in a longitudinal direction A (a direction of an arrow A in FIGS. 12 and 13), of the main body portion 31 having the horizontally long rectangular shape. The first end surface 263 and the second end surface 264 constitute end surfaces, in a lateral direction B (a direction of an arrow B in FIGS. 12 and 14), of the main body portion 31 having the horizontally long rectangular shape.

The reflective film 32 is formed on the first surface 261 of the main body portion 31. The reflective film 32 is made of a material that reflects light. The reflective film 32 is formed by, for example, vapor-depositing a metal such as aluminum on the first surface 261 of the main body portion 31. Instead of forming the reflective film 32 on the first surface 261 by aluminum vapor deposition or the like, the main body portion 31 itself may be made of a white resin material capable of reflecting light.

The first protruding portion 33 is a plate-shaped member formed at an end portion of the main body portion 31 on a first end surface 263 side. The first protruding portion 33 is provided to protrude from the first surface 261 toward a second surface 262 side so as to be continuous from the first end surface 263 of the main body portion 31. A tip end of the first protruding portion 33 is located at a position different from the first end surface 263 in a direction along the rotation axis D and located at a position on the side opposite to the first surface 261 that is the reflective surface, that is, the tip end is located outside the first end surface 263 in the direction along the rotation axis D. Specifically, the first protruding portion 33 is provided so as to extend in a direction which is inclined by an angle θ1 outward from a direction C (a direction of an arrow C in FIGS. 13 and 14) orthogonal to the longitudinal direction A and the lateral direction B of the main body portion 31. The angle θ1 is, for example, 15 degrees.

As shown in FIG. 14, the first protruding portion 33 includes a first continuous surface 231 that is continuous with the first end surface 263. The first continuous surface 231 is formed in a so-called flared shape in which a width of the first continuous surface 231 in the lateral direction B of the main body portion 31 is increased toward the first end surface 263. Each of inclination edges on both sides of the first continuous surface 231 having the flared shape is formed such that an inclination angle θ2 of the inclination edge with respect to the direction C is, for example, 15 degrees or more, and the direction C is a direction protruding substantially perpendicularly from the first end surface 263 of the first protruding portion 33. A rising portion 232 at which the inclination edges on the both sides of the first continuous surface 231 rise from the first end surface 263 is formed to have a circular arc shape.

The second protruding portion 34 is a plate-shaped member formed at an end portion of the main body portion 31 on a second end surface 264 side. The second protruding portion 34 is provided to protrude from the first surface 261 toward the second surface 262 side so as to be continuous from the second end surface 264 of the main body portion 31. A tip end of the second protruding portion 34 is located at a position different from the second end surface 264 in the direction along the rotation axis D and located at a position on the side opposite to the first surface 261 that is the reflective surface, that is, the tip end is located outside the second end surface 264 in the direction along the rotation axis D. Similarly to the first protruding portion 33, the second protruding portion 34 is provided so as to extend in a direction which is inclined by the angle θ1 outward from the direction C.

The second protruding portion 34 includes a second continuous surface 241 that is continuous with the second end surface 264. Similarly to the first continuous surface 231, the second continuous surface 241 is formed in a flared shape in which a width of the second continuous surface 241 in the lateral direction B of the main body portion 31 is increased toward the second end surface 264. Since the shape of the second continuous surface 241 is the same as that of the first protruding portion 33, the shape is not shown.

The first shaft portion 35 is provided on the first continuous surface 231 of the first protruding portion 33, that is, on a surface on an opposite side to a surface on a side that faces the second protruding portion 34. The first shaft portion 35 is formed so as to extend, along the rotation axis D, from the first continuous surface 231 toward a side opposite to the main body portion 31, that is, toward a left outer side. The first shaft portion 35 includes a fitting shaft portion 35a and a fitting target shaft portion 35b that is a target object into which the fitting shaft portion 35a is fitted. The fitting shaft portion 35a is integrally formed with the first protruding portion 33, and is formed continuously from the first continuous surface 231. On the other hand, the fitting target shaft portion 35b is a component separate from the main body portion 31, and is attached to the main body portion 31 by being fitted to the fitting shaft portion 35a.

The fitting shaft portion 35a is formed in a D-shape with an outer peripheral surface thereof partially cut out. An outer surface of the fitting target shaft portion 35b is formed in a circular shape. A diameter of the fitting shaft portion 35a is formed to be smaller than a diameter of the fitting target shaft portion 35b. The fitting target shaft portion 35b is formed with a fitting hole into which the fitting shaft portion 35*a* is fitted. Although not shown, the fitting hole of the fitting target shaft portion 35*b* has the same D-shape as the shape of the fitting shaft portion 35*a*, and is formed to have a diameter of a size that is substantially the same as that of the fitting shaft portion 35*a*. The fitting target shaft portion 35*b* is attached to the main body portion 31 by being fitted to the fitting shaft portion 35*a*, and constitutes the first shaft portion 35 together with the fitting shaft portion 35*a*. The first shaft portion 35 functions as a shaft portion that rotates the main body portion 31 about the rotation axis D.

The second shaft portion 36 is provided on the second continuous surface 241 of the second protruding portion 34, that is, on a surface on an opposite side to a surface on a side that faces the first protruding portion 33. The second shaft portion 36 is formed so as to extend, along the rotation axis D, from the second continuous surface 241 toward a side opposite to the main body portion 31, that is, toward a right outer side. The second shaft portion 36 is formed in a columnar shape. A diameter of the second shaft portion 36 is formed to be a size which is substantially the same as the diameter of the fitting target shaft portion 35*b* of the first shaft portion 35. The second shaft portion 36 functions, together with the first shaft portion 35, as a shaft portion that rotates the main body portion 31 about the rotation axis D.

As shown in FIG. 13, the first shaft portion 35 and the second shaft portion 36 are disposed such that the rotation axis D passes through a first surface 261 side rather than a top portion P of the second surface 262 having the convex shape which is the back surface side of the main body portion 31. Alternatively, the first shaft portion 35 and the second shaft portion 36 may be disposed such that the rotation axis D is in contact with the top portion P.

Figure 15:
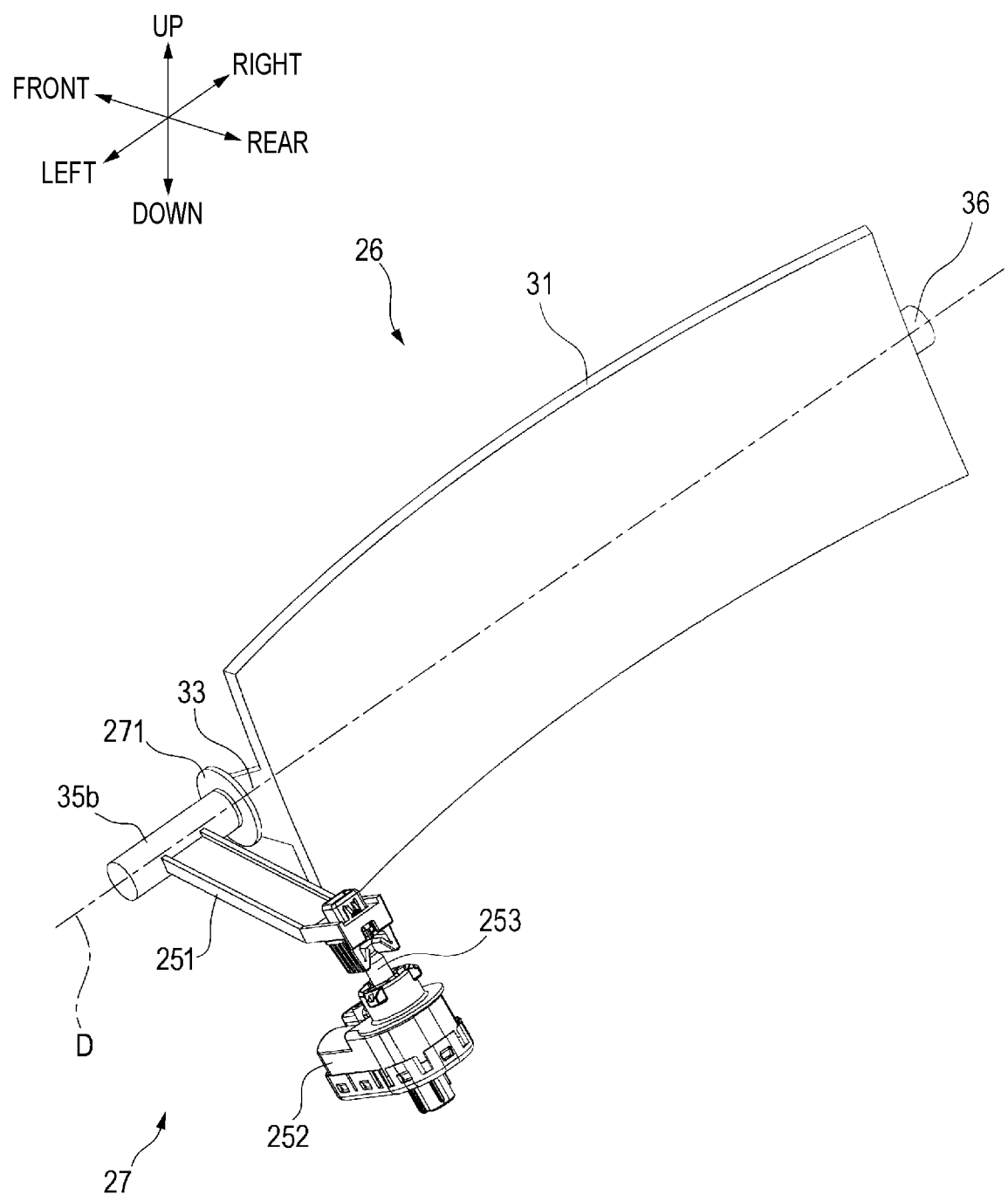
FIG. 15 is a perspective view of a state where the rotation mechanism is attached to the reflector.
Figure 16:
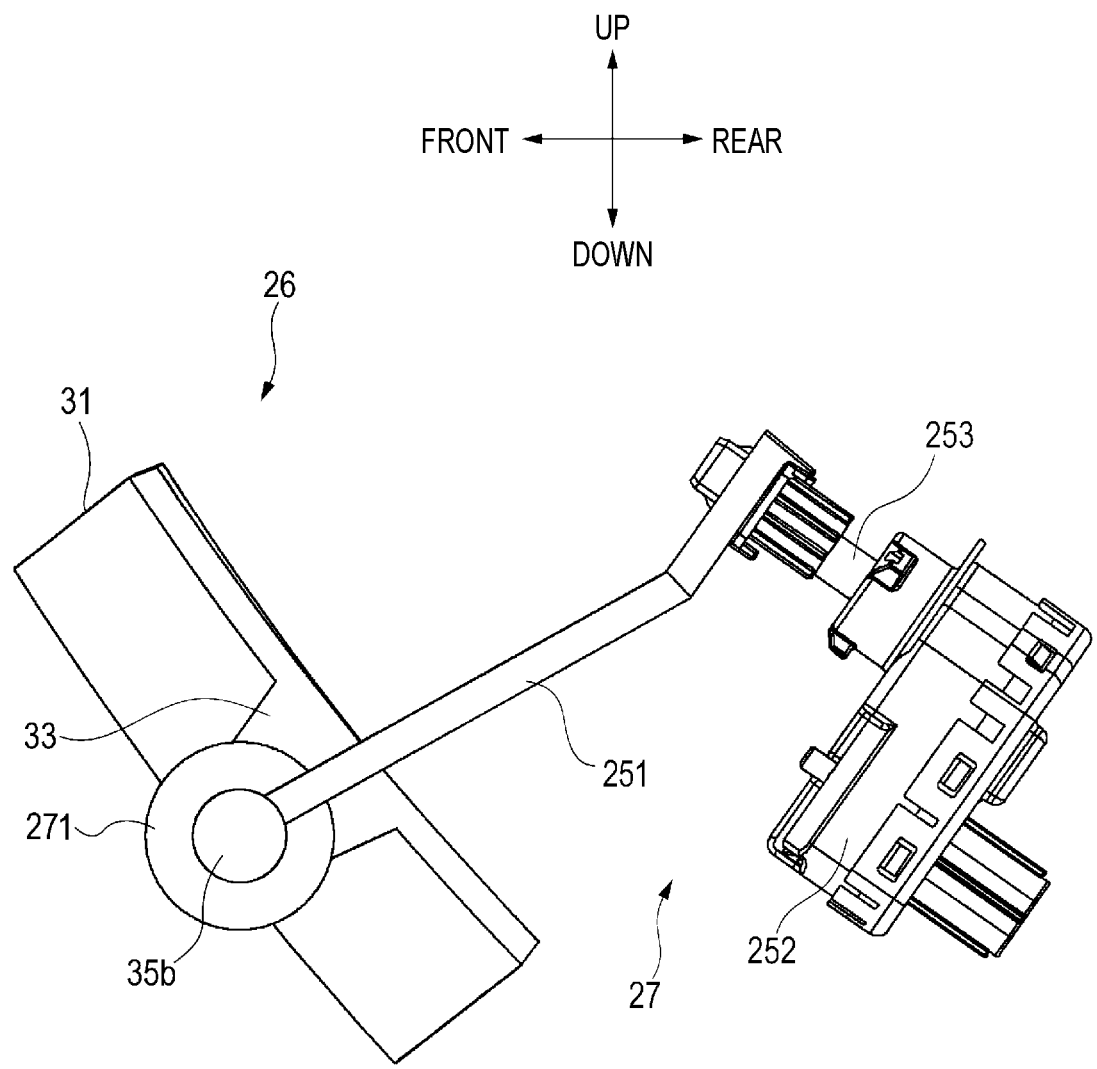
FIG. 16 is a side view of the state shown in FIG. 15.

FIG. 15 is a perspective view of the concave mirror 26 and the rotation mechanism 27 attached to the concave mirror 26 when viewed from the front surface side of the concave mirror 26. FIG. 16 is a side view of a state shown in FIG. 15.

As shown in FIGS. 15 and 16, the rotation mechanism 27 includes the fitting target shaft portion 35*b*, an arm portion 251, and a drive unit 252.

The fitting target shaft portion 35*b* is a part of the first shaft portion 35 constituting the concave mirror 26 described above. The fitting target shaft portion 35*b* extends along the rotation axis D in a state of being fitted to the fitting shaft portion 35*a* of the concave mirror 26. The fitting target shaft portion 35*b* includes a flange 271 at an end portion thereof on a first protruding portion 33 side of the main body portion 31. The flange 271 is provided so as to protrude in a radial direction from an outer periphery of the fitting target shaft portion 35*b*. In the present embodiment, the flange 271 having a circular plate shape is provided over the entire periphery of the fitting target shaft portion 35*b*.

The arm portion 251 is a plate-shaped member extending from the fitting target shaft portion 35*b* toward the drive unit 252. One end of the arm portion 251 is formed integrally with the fitting target shaft portion 35*b*. The drive unit 252 is attached to the other end of the arm portion 251. The drive unit 252 includes, for example, a worm gear and a DC motor. The drive unit 252 includes an extendable shaft portion 253, and operates the arm portion 251 by extension and contraction of the shaft portion 253. The rotation mechanism 27 rotates the concave mirror 26 about the rotation axis D by moving the arm portion 251 in a direction along the radial direction of the fitting target shaft portion 35*b* (first shaft portion 35) by the drive unit 252. As a result, an orientation of the first surface 261 which is the reflective surface of the concave mirror 26 is changed.

Figure 17:
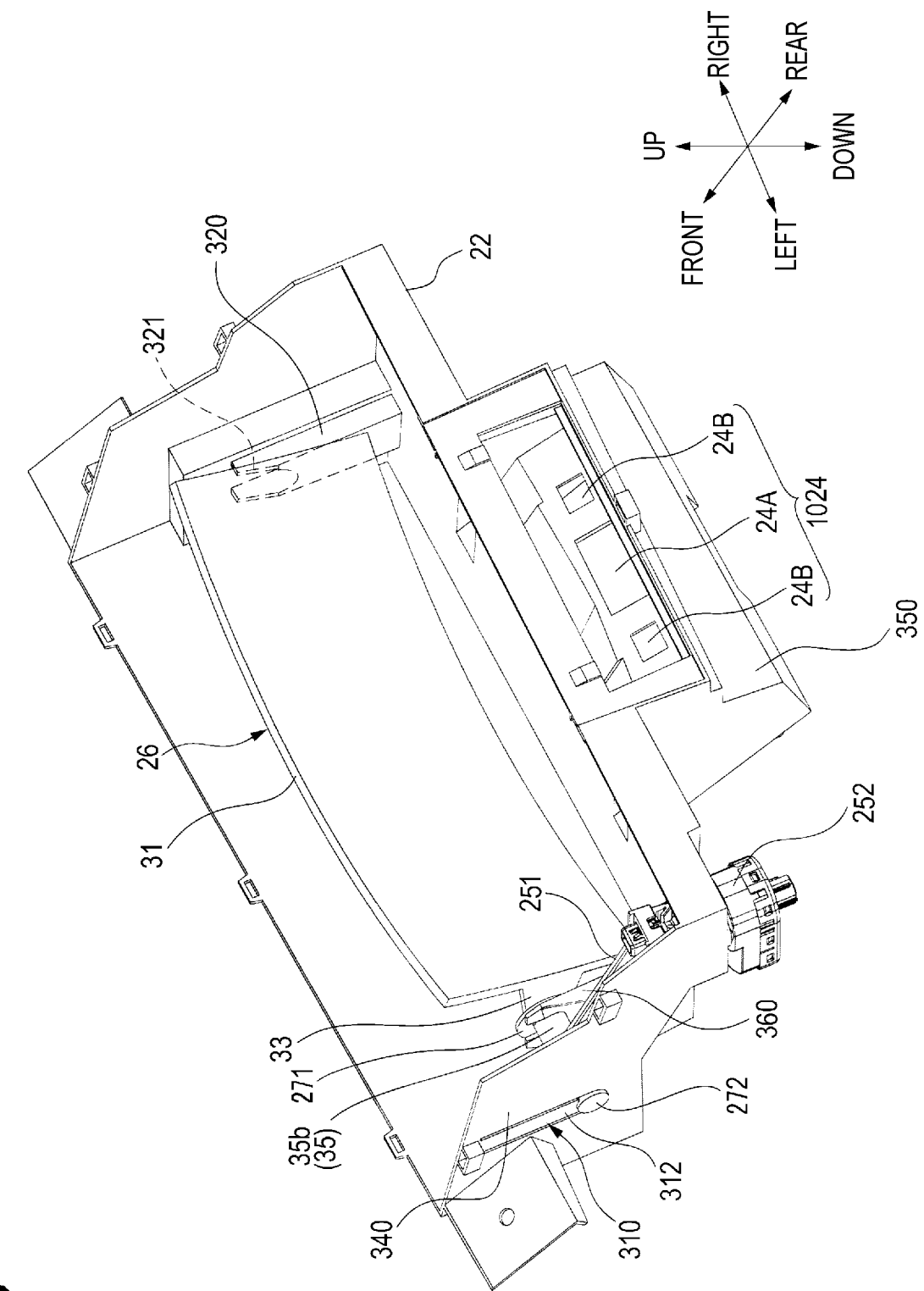
FIG. 17 is a perspective view showing a state where the reflector and the picture generation apparatus are accommodated in a housing in the second embodiment.
Figure 18:
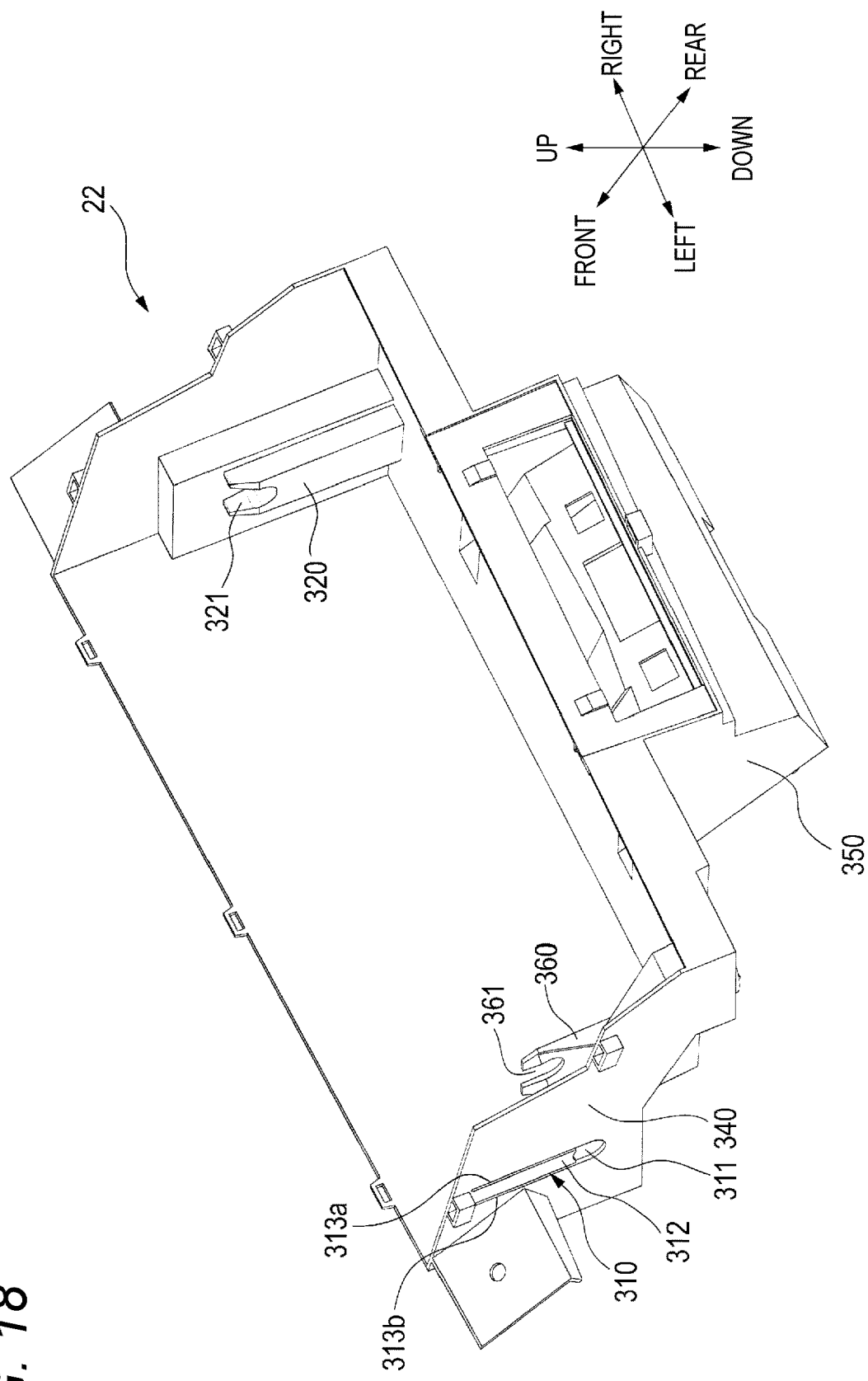
FIG. 18 is a perspective view of the housing in a state where the reflector is removed in the second embodiment.
Figure 19:
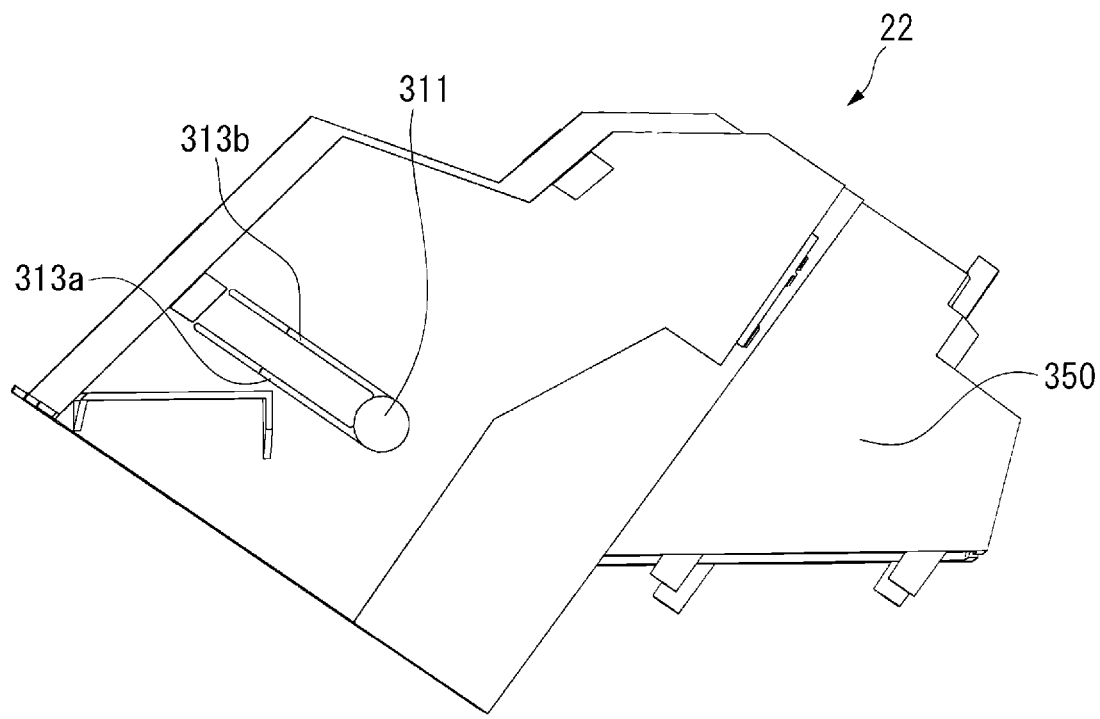
FIG. 19 is a side view of the state shown in FIG. 17.

FIG. 17 is a perspective view showing a state where the concave mirror 26 and the rotation mechanism 27 are accommodated in the main body housing 22. FIG. 18 is a perspective view of the main body housing 22 in a state where the concave mirror 26 and the rotation mechanism 27 are removed. FIG. 19 is a side view of the main body housing 22 in the state in FIG. 18.

As shown in FIGS. 17 to 19, the main body housing 22 includes: a first accommodation portion 310 that can accommodate the first shaft portion 35 of the concave mirror 26; a second accommodation portion 320 that can accommodate the second shaft portion 36 of the concave mirror 26; and a restriction portion 360 that restricts movement of the concave mirror 26.

The first accommodation portion 310 is disposed at a left end portion of the main body housing 22, and the second accommodation portion 320 is disposed at a right end portion of the main body housing 22. The restriction portion 360 is provided between the first accommodation portion 310 and the second accommodation portion 320. That is, the first accommodation portion 310, the second accommodation portion 320, and the restriction portion 360 are provided side by side on a straight line in the left-right direction of the main body housing 22.

In the present example, the first accommodation portion 310 is provided on a left side wall 340 of the main body housing 22. The first accommodation portion 310 includes a circular hole portion 311 in which the first shaft portion 35 is accommodated, and a deformation portion 312 provided obliquely upward on a front side of the hole portion 311 so as to form a part of a shape of the hole portion 311. The fitting target shaft portion 35*b* of the first shaft portion 35 is accommodated in the hole portion 311. The fitting target shaft portion 35*b* is accommodated in a state where a tip end portion thereof is accommodated in the hole portion 311 and a tip end surface 272 thereof is exposed to an outside of the first accommodation portion 310 from the hole portion 311.

The deformation portion 312 is defined in a substantially rectangular shape by a pair of slits 313*a* and 313*b* provided in the left side wall 340 of the main body housing 22. The pair of slits 313*a* and 313*b* are provided so as to be continuous with the hole portion 311. That is, one end portion of the deformation portion 312 is continuous with the left side wall 340 of the main body housing 22, and the other end portion of the deformation portion 312 forms a part of the shape of the hole portion 311. The deformation portion 312 is elastically deformable, and is easily deformed along the left-right direction of the main body housing 22.

The second accommodation portion 320 includes a recess 321 in which the second shaft portion 36 is accommodated. The recess 321 is formed to have a diameter the same as that of the second shaft portion 36 or slightly larger than that of the second shaft portion 36 so that the accommodated second shaft portion 36 can rotate in the recess 321. The recess 321 of the second accommodation portion 320 is formed in, for example, a substantially U-shape having an opening that allows the second shaft portion 36 to be inserted therein and removed therefrom.

The restriction portion 360 is formed in a plate shape and is provided so as to extend in a direction that is substantially the same as an extending direction of the pair of slits 313*a* and 313*b*. The restriction portion 360 is provided at a position close to the first accommodation portion 310 between the first accommodation portion 310 and the second accommodation portion 320. The restriction portion 360 includes a recess 361 in which the first shaft portion 35 can be accommodated. Similarly to the first accommodation portion 310, the recess 361 is accommodated therein with the fitting target shaft portion 35*b* of the first shaft portion 35. The recess 361 is formed to have a diameter the same as that of the fitting target shaft portion 35*b* or slightly larger than that of the fitting target shaft portion 35*b* so that the accommodated fitting target shaft portion 35*b* can rotate in the recess 361. The recess 361 of the restriction portion 360 is formed in, for example, a substantially U-shape having an opening that allows the fitting target shaft portion 35*b* to be inserted therein and removed therefrom. The fitting target shaft portion 35*b* is accommodated in the recess 361 such that the flange 271 provided on the first protruding portion 33 side is disposed on an inner side of the restriction portion 360 (a side close to the second accommodation portion 320). In a state where the concave mirror 26 is accommodated in the main body housing 22, that is, in a state where the fitting target shaft portion 35*b* is accommodated in the recess 361 of the restriction portion 360, the flange 271 of the fitting target shaft portion 35*b* abuts against the restriction portion 360, so that the restriction portion 360 restricts movement of the concave mirror 26 in a direction toward the first accommodation portion 310 (leftward direction).

The concave mirror 26 is attached to the main body housing 22 as follows. First, a worker accommodates the second shaft portion 36 in the recess 321 by inserting the second shaft portion 36 of the concave mirror 26 into the recess 321 of the second accommodation portion 320 of the main body housing 22. Next, the worker accommodates the fitting target shaft portion 35*b* in the recess 361 of the restriction portion 360 such that the flange 271 of the fitting target shaft portion 35*b* is arranged on the inner side of the restriction portion 360. Further, the worker moves an end portion of the fitting target shaft portion 35*b* to the hole portion 311 of the first accommodation portion 310 while pushing, with the tip end portion of the fitting target shaft portion 35*b*, the deformation portion 312 of the first accommodation portion 310 of the main body housing 22 toward an outer side (leftward direction) of the main body housing 22, and then elastically deforming the deformation portion 312. By moving the end portion of the fitting target shaft portion 35*b* to the hole portion 311, the deformation portion 312 pushed out to the outer side of the main body housing 22 returns to an original position and is disposed on the front side of the hole portion 311 so as to form a part of the shape of the hole portion 311. The fitting target shaft portion 35*b* is accommodated in the hole portion 311 in the state where the tip end surface 272 thereof is exposed to the outside of the first accommodation portion 310 from the hole portion 311. As a result, the concave mirror 26 is accommodated in the main body housing 22 in a state of being positioned with respect to the main body housing 22, and is rotatable about the rotation axis D.

The rotation mechanism 27 is accommodated behind the first shaft portion 35 of the concave mirror 26, that is, in a rear portion of a left end of the main body housing 22. The arm portion 251 of the rotation mechanism 27 is disposed between the first accommodation portion 310 (left side wall 340) and the restriction portion 360. The drive unit 252 of the rotation mechanism 27 is disposed at a side portion of a PGU housing portion 350 in which the picture generation apparatus/unit (PGU) 1024 is accommodated, specifically, at a left side portion of the PGU housing portion 350.

As described above, the concave mirror 26 according to the second embodiment is rotatable about the rotation axis D, and includes: the plate-shaped main body portion 31 including the first surface 261 formed with the reflective film 32 that reflects light, the first end surface 263, and the second end surface 264; the plate-shaped first protruding portion 33 protruding toward the second surface 262 side that is a back surface of the first surface 261 so as to be continuous from the first end surface 263; and the plate-shaped second protruding portion 34 protruding toward the second surface 262 side so as to be continuous from the second end surface 264. The concave mirror 26 further includes the first shaft portion 35 provided on the first protruding portion 33 and the second shaft portion 36 provided on the second protruding portion 34 in order to rotate the main body portion 31 about the rotation axis D. The tip end of the first protruding portion 33 is located at the position different from the first end surface 263 in the direction along the rotation axis D and located on the side opposite to the first surface 261. Similarly, the tip end of the second protruding portion 34 is located at the position different from the second end surface 264 in the direction along the rotation axis D and located on the side opposite to the first surface 261. According to the configuration, each of the first protruding portion 33 and the second protruding portion 34 protrudes from a respective one of both end portions of the main body portion 31 toward the second surface 262 side and extends in a direction inclined outward from the main body portion 31, and thus the concave mirror 26 is easily manufactured by molding. Therefore, the concave mirror 26 having a large size can be molded in one piece by using a mold. Therefore, moldability of the concave mirror 26 can be improved. Furthermore, according to the configuration, when the concave mirror 26 is attached to the main body housing 22, an interval between the main body portion 31 and the main body housing 22 is sufficiently secured by the first protruding portion 33 and the second protruding portion 34 that are inclined outward. Therefore, even when the concave mirror 26 is rotated, the main body portion 31 is not in direct contact with the main body housing 22, so that the reflective film 32 formed on the first surface 261 of the main body portion 31 can be prevented from being by being in contact with the main body housing 22.

In the concave mirror 26 according to the second embodiment, the first surface 261 is formed in the concave shape, and the first shaft portion 35 and the second shaft portion 36 are disposed such that the rotation axis D of the first shaft portion 35 and the second shaft portion 36 is in contact with the top portion P on the back surface side of the first surface 261 having the concave shape, or passes through the front surface side rather than the top portion P. Thus, by increasing a curvature of the main body portion 31, a surface area of the curved first surface 261 is larger than a surface area of a first surface when a distance between the first shaft portion 35 and the second shaft portion 36 is set to the same distance as in the present example and a main body portion is formed in a planar shape. As a result, an effective area of the light reflected by the concave mirror 26 can be increased.

In the concave mirror 26 according to the second embodiment, the fitting shaft portion 35*a* of the first shaft portion 35 is formed in the D-shape with the outer peripheral surface thereof partially cut out. Therefore, it is possible to easily restrict a rotation direction of the fitting shaft portion 35*a* and the fitting target shaft portion 35*b* when the fitting shaft portion 35*a* is fitted into the fitting target shaft portion 35*b* that is a fitting target of the rotation mechanism 27. As a result, the fitting shaft portion 35*a* of the concave mirror 26 can be smoothly rotated by the rotation mechanism 27, and the position and an angle of the concave mirror 26 can be accurately adjusted.

In the concave mirror 26 according to the second embodiment, each of the first continuous surface 231 of the first protruding portion 33 and the second continuous surface 241 of the second protruding portion 34 is formed in the flared shape that is widened toward a respective one of the first end surface 263 and the second end surface 264, the first continuous surface 231 is continuous with the first end surface 263, and the second continuous surface 241 is continuous with the second end surface 264. Specifically, it is preferable that the inclination edges on the both sides of each of the first continuous surface 231 and the second continuous surface 241 each have an inclination of 15 degrees or more with respect to the direction C. According to the configuration, it is possible to secure an extraction angle of the mold when the concave mirror 26 is molded. Further, it is possible to increase strengths of the first protruding portion 33 and the second protruding portion 34 by widening skirt portions of the first protruding portion 33 and the second protruding portion 34 that are respectively continuous with the first end surface 263 and the second end surface 264.

In the concave mirror 26 according to the second embodiment, a portion of the first protruding portion 33 that rises from the first end surface 263, and a portion of the second protruding portion 34 that rises from the second end surface 264 are each formed to have a circular arc shape. Therefore, it is possible to prevent burrs from being generated at the rising portions of the first protruding portion 33 and the second protruding portion 34 during molding of the concave mirror 26.

Furthermore, the HUD 1020 according to the second embodiment includes: the picture generation apparatus 1024 (an example of a picture generation unit) that emits the light for generating the predetermined picture; the concave mirror 26 (an example of a reflection unit) that reflects the light emitted by the picture generation apparatus 1024 such that the light is emitted to the windshield; and the main body housing 22 that accommodates the picture generation apparatus 1024 and the concave mirror 26. The concave mirror 26 includes the main body portion 31, the first shaft portion 35 protruding outward from one end portion of the main body portion 31, and the second shaft portion 36 protruding outward from the other end portion of the main body portion 31. The first shaft portion 35 and the second shaft portion 36 are both attached to the main body housing 22. Furthermore, the main body housing 22 includes at least the first accommodation portion 310 that can accommodate the end portion of the first shaft portion 35, and the tip end surface 272 of the end portion of the first shaft portion 35 is exposed to the outside from the first accommodation portion 310. According to the configuration, since a configuration is used in which the first shaft portion 35 and the second shaft portion 36 of the concave mirror 26 are directly attached to the main body housing 22, the number of components can be reduced. As a result, the concave mirror 26 can be mounted in the HUD 1020 with low cost and a simple configuration.

According to the HUD 1020, the first accommodation portion 310 includes the hole portion 311, and the deformation portion 312 that is defined by the pair of slits 313a and 313b provided continuously with the hole portion 311 and that is elastically deformable. In a state where the second shaft portion 36 is accommodated in the second accommodation portion 320, the fitting target shaft portion 35b moves to the hole portion 311 while elastically deforming the deformation portion 312 and is accommodated in the hole portion 311, so that the concave mirror 26 is attached to the main body housing 22. Therefore, the fitting target shaft portion 35b can be accommodated in the hole portion 311 by a simple work of pushing the deformation portion 312 with the end portion of the fitting target shaft portion 35b to elastically deform the deformation portion 312, and a part of the outer periphery of the fitting target shaft portion 35b accommodated in the hole portion 311 can be surrounded by the deformation portion 312 that returns to an original state. As a result, the concave mirror 26 accommodated in the main body housing 22 can be reliably positioned and fixed.

According to the HUD 1020, the main body housing 22 includes the restriction portion 360 that restricts the movement of the concave mirror 26 in the predetermined direction, and the fitting target shaft portion 35b includes the flange 271 protruding from the outer periphery of the fitting target shaft portion 35b. When the concave mirror 26 is accommodated in the main body housing 22, the flange 271 abuts against the restriction portion 360, so that the movement of the concave mirror 26 in the one direction is restricted. Therefore, rattling of the concave mirror 26 when the concave mirror 26 is attached to the main body housing 22 can be prevented with a simple configuration.

According to the HUD 1020, the rotation mechanism 27 that rotates the concave mirror 26 includes: the fitting target shaft portion 35b; the arm portion 251 extending from the fitting target shaft portion 35b along the radial direction of the fitting target shaft portion 35b; and the drive unit 252 connected to an end portion of the arm portion 251 on a side opposite to the fitting target shaft portion 35b. As a result, the drive unit 252 that rotates the concave mirror 26 can be disposed, for example, at the side portion of the PGU housing portion 350 in which the picture generation apparatus 1024 is accommodated. Therefore, when the concave mirror 26 is attached to the main body housing 22, the rotation mechanism 27 does not hinder an attachment work, and attachment workability of the concave mirror 26 can be improved.

According to the HUD 1020, the fitting target shaft portion 35b of the first shaft portion 35 is provided as a component separate from the main body portion 31, and can be attached to the fitting shaft portion 35a of the first shaft portion 35 protruding from the end portion of the main body portion 31. Therefore, the reflective film 32 can be formed on the first surface 261 of the main body portion 31 by the aluminum vapor deposition in a state where the fitting target shaft portion 35b is removed from the main body portion 31, and workability during the aluminum vapor deposition can be improved.

Third Embodiment

Hereinafter, a concave mirror according to a third embodiment will be described with reference to FIGS. 20 to 25.

Figure 20:
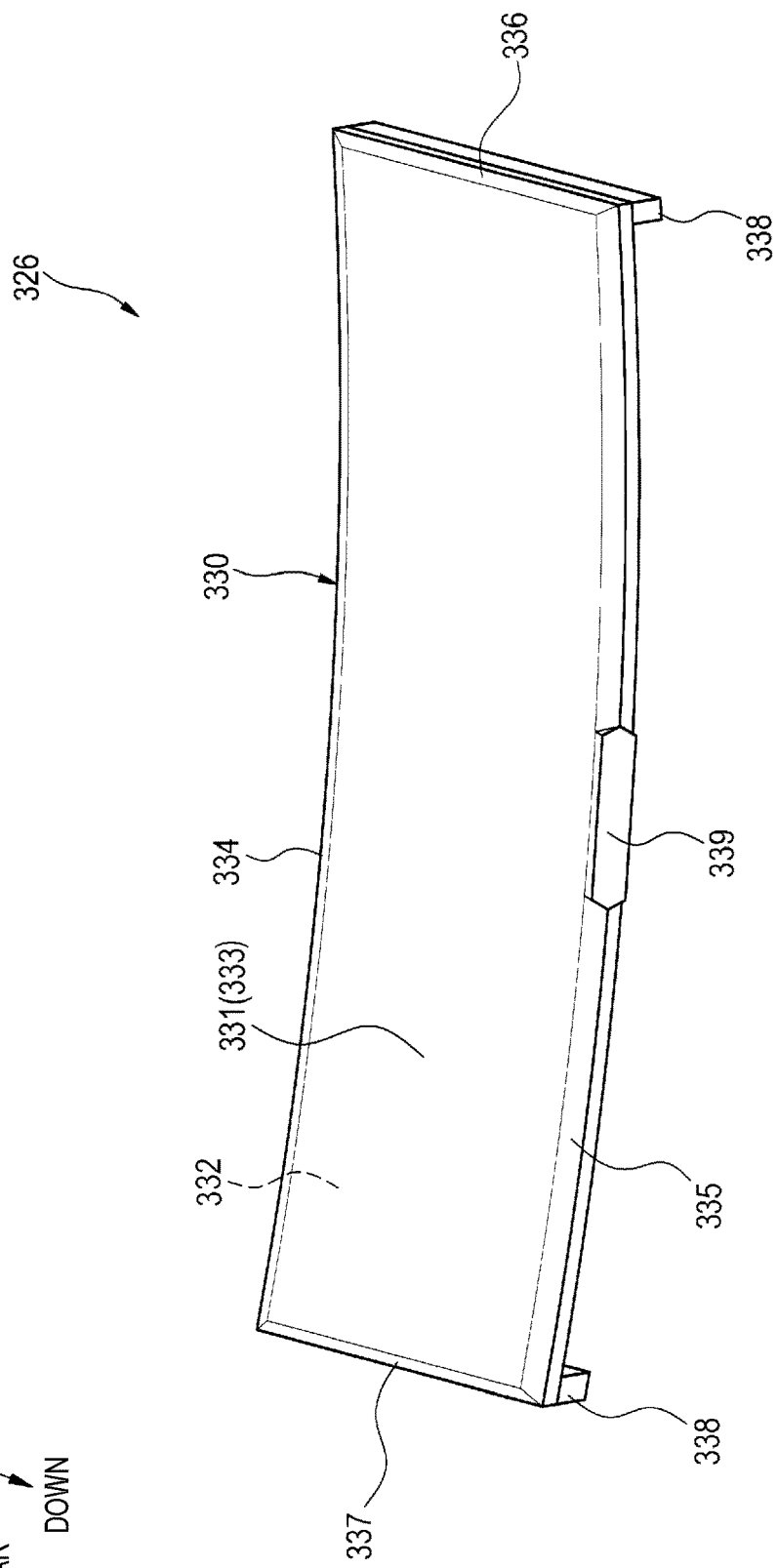
FIG. 20 is a perspective view of a reflector of the head-up display shown in FIG. 2 in a third embodiment.

FIG. 20 is a perspective view of a concave mirror 326 according to the third embodiment. As shown in FIG. 20, the concave mirror 326 includes a substrate 330 that includes a first surface 331 and a second surface 332 located on a side opposite to the first surface 331. In addition to the substrate 330, the concave mirror 326 includes a reflective film 333 that is formed on the first surface 331 and reflects the light emitted from the picture generation apparatus 24. In the present embodiment, the first surface 331 and the reflective film 333 are located on a rear side of the substrate 330, and the second surface 332 is positioned on a front side of the substrate 330.

The substrate 330 is a member serving as a base for defining a shape of the concave mirror 326. The substrate 330 is, for example, injection-molded using a mold by using a polycarbonate resin as a raw material. The reflective film 333 is formed by vapor-depositing a metal such as aluminum on the first surface 331 of the molded substrate 330. The reflective film 333 is configured to reflect the light emitted from the picture generation apparatus 24 and to emit the light toward the windshield 18. In the present embodiment, the material of the substrate 330 is the resin, but may be glass.

The substrate 330 has a rectangular shape when viewed from a direction in which the light emitted from the picture generation apparatus 24 is incident on the substrate 330. In the present embodiment, one (upper) long side of the substrate 330 is defined as an upper end portion 334, the other (lower) long side of the substrate 330 is defined as a lower end portion 335, one (right) short side of the substrate 330 is defined as a right end portion 336, and the other (left) short side of the substrate 330 is defined as a left end portion 337. An entire outer periphery of the substrate 330 includes all of the upper end portion 334, the lower end portion 335, the right end portion 336, and the left end portion 337. The reflective film 333 may also be vapor-deposited on each end portion of the substrate 330.

Figure 21:
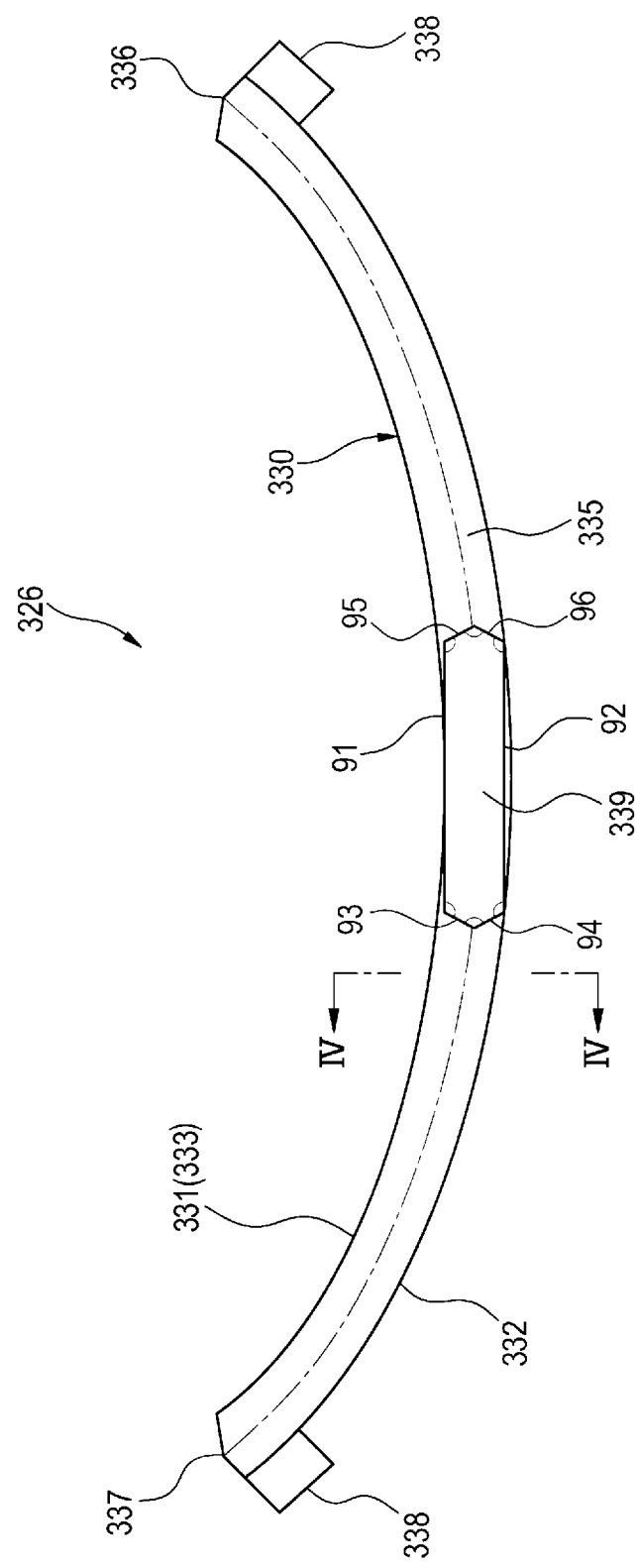
FIG. 21 is a bottom view of the reflector in FIG. 20.

FIG. 21 is a bottom view of the concave mirror 326. As shown in FIG. 21, the concave mirror 326 includes a pair of ribs 338 that hold the substrate 330. One rib 338 is provided on the second surface 332 and at the right end portion 336, and the other rib 338 is provided on the second surface 332 and at the left end portion 337. A strength of the substrate 330 is reinforced by the pair of ribs 338. Although not shown, the concave mirror 326 may be supported by the main body housing 22 via the pair of ribs 338.

A gate portion 339, which is a spout of the resin during injection molding of the substrate 330, is provided at the lower end portion 335 of the substrate 330. In the present embodiment, the gate portion 339 is located at a center of the substrate 330 in the left-right direction. One gate portion 339 is provided at the lower end portion 335 in the present embodiment, but may be provided at the upper end portion 334. Gate portions 339 may also be provided at the upper end portion 334 and the lower end portion 335, respectively.

In a thickness direction of the substrate 330, a shape of the gate portion 339 is, for example, a hexagonal shape extending in the left-right direction. As shown in FIG. 21, the hexagonal shape of the gate portion 339 includes a first gate surface 91, a second gate surface 92, a third gate surface 93, a fourth gate surface 94, a fifth gate surface 95, and a sixth gate surface 96. The first gate surface 91 is a surface extending downward from the first surface 331. The second gate surface 92 is a surface extending downward from the second surface 332. The third gate surface 93 is a surface extending from the first gate surface 91 and defining an upper left portion of the hexagonal shape. The fourth gate surface 94 is a surface extending from the second gate surface 92 and defining a lower left portion of the hexagonal shape. The fifth gate surface 95 is a surface extending from the first gate surface 91 and defining an upper right portion of the hexagonal shape. The sixth gate surface 96 is a surface extending from the second gate surface 92 and defining a lower right portion of the hexagonal shape.

Angles that define the hexagonal shape of the gate portion 339 are all obtuse angles. In other words, an angle between the first gate surface 91 and the third gate surface 93 is an obtuse angle. An angle between the second gate surface 92 and the fourth gate surface 94 is an obtuse angle. An angle between the first gate surface 91 and the fifth gate surface 95 is an obtuse angle. An angle between the second gate surface 92 and the sixth gate surface 96 is an obtuse angle. An angle between the third gate surface 93 and the fourth gate surface 94 is an obtuse angle. An angle between the fifth gate surface 95 and the sixth gate surface 96 is an obtuse angle. In the present disclosure, the obtuse angle is an angle greater than 90 degrees. Each of the angles that define the hexagonal shape of the gate portion 339 is, for example, 120 degrees.

Since the gate portion 339 has the hexagonal shape, an injection pressure for the resin at corner portions of the spout is distributed as compared with a case where a gate portion has a quadrangular shape. Therefore, the resin is injected more uniformly. Further, since the angles that define the hexagonal shape of the gate portion 339 are the obtuse angles, vicinities of the obtuse angles are cooled and solidified more hardly and are molded and shrunk more easily during molding as compared with a case where the angles are each an acute angle or 90 degrees. Therefore, a difference in molding shrinkage is hardly generated when the vicinities of these obtuse angles are compared with a portion other than the obtuse angles, and thus distortion of the gate portion 339 during molding is prevented.

Figure 22:
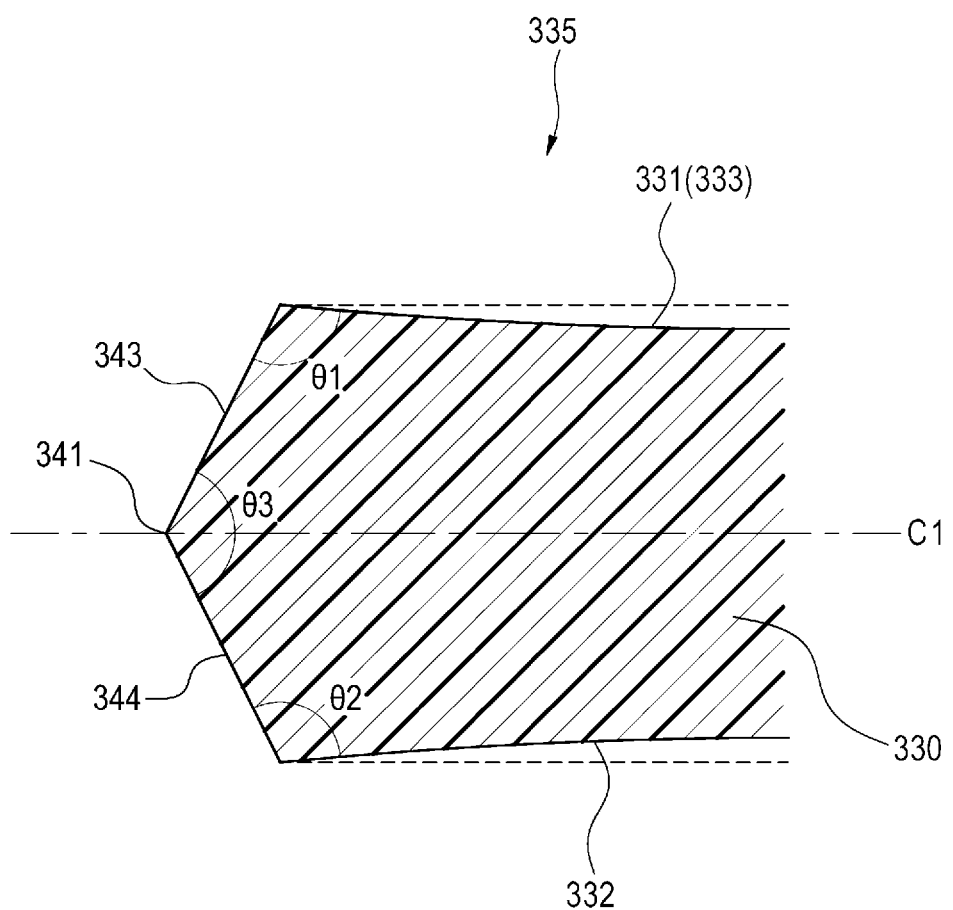
FIG. 22 is an enlarged cross-sectional view of an end portion of the reflector.

FIG. 22 is an enlarged cross-sectional view, in the thickness direction of the substrate 330, of the lower end portion 335 of the concave mirror 326 shown in FIG. 21. The substrate 330 shrinks slightly during molding. In FIG. 22, a virtual position when the substrate 330 does not shrink in molding, that is, when the substrate 330 has the same size as the mold, is indicated by a broken line in FIG. 22. The first surface 331 and the second surface 332 are a rear side surface and a front side surface of the substrate 330 after molding and shrinkage, respectively.

As shown in FIG. 22, at least a part of the lower end portion 335 is provided with a third surface 343 and a fourth surface 344 between the first surface 331 and the second surface 332. The third surface 343 is a surface extending from an extreme tip end portion 341 of the lower end portion 335 to the first surface 331. The fourth surface 344 is a surface extending from the extreme tip end portion 341 of the lower end portion 335 to the second surface 332. The extreme tip end portion 341 is located on a center C1 of the substrate 330 in the thickness direction. The third surface 343 and the fourth surface 344 are formed to be line-symmetric with respect to the center C1 of the substrate 330 in the thickness direction.

The third surface 343 and the fourth surface 344 are provided on the lower end portion 335 that is one long side of the substrate 330, and are also formed on the upper end portion 334 that is the other long side in addition to the lower end portion 335. Since an end portion shape of the upper end portion 334 is the same as a shape of the lower end portion 335, description thereof is omitted. The third surface 343 and the fourth surface 344 are formed at least on a portion of the lower end portion 335 other than the gate portion 339, but may also be formed on the gate portion 339.

An angle θ1 between the first surface 331 and the third surface 343 is an obtuse angle. An angle θ2 between the second surface 332 and the fourth surface 344 is an obtuse angle. An angle θ3 between the third surface 343 and the fourth surface 344 is an obtuse angle. In other words, each of the upper end portion 334 and the lower end portion 335 is formed with at least three obtuse angles θ1, θ2, and θ3 in a cross section of the substrate in the thickness direction.

Figure 23:
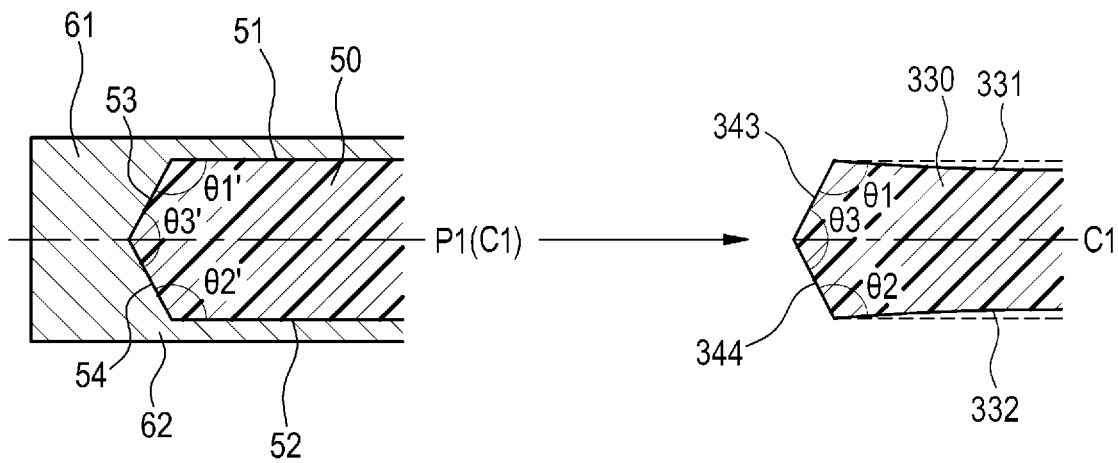
FIG. 23 is a cross-sectional view during molding of a substrate of the reflector.

Next, injection molding of the substrate 330 will be described. FIG. 23 is a cross-sectional view of the substrate 330 during molding. As shown in FIG. 23, a resin 50 for the substrate 330 is injected into a cavity of a pair of molds 61 and 62. A parting line P of the pair of molds 61 and 62 coincides with the center C1 of the substrate 330 in the thickness direction.

In FIG. 23, in the resin 50 injected into the cavity of the pair of molds 61 and 62, a surface corresponding to the first surface 331 of the substrate 330 is a surface 51, a surface corresponding to the second surface 332 is a surface 52, a surface corresponding to the third surface 343 is a surface 53, and a surface corresponding to the fourth surface 344 is a surface 54. The pair of molds 61 and 62 are formed such that an angle $\theta1'$ between the surface 51 and the surface 53, an angle $\theta2'$ between the surface 52 and the surface 54, and an angle $\theta3'$ between the surface 53 and the surface 54 are all obtuse angles. The angles $\theta1'$, $\theta2'$, and $\theta3'$ correspond to the obtuse angles $\theta1$, $\theta2$, and $\theta3$, respectively. Each of the angles $\theta1'$, $\theta2'$, and $\theta3'$ is, for example, an angle of about 120 degrees.

The resin 50 passes through the gate portion 339 and is injected into the cavity of the pair of molds 61 and 62, and is then cooled via the pair of molds 61 and 62. The resin 50 is gradually cooled from surfaces in contact with the pair of molds 61 and 62 toward a center. A state of cooling and solidification at this time will be described together with a comparative example shown in FIG. 24.

Figure 24:
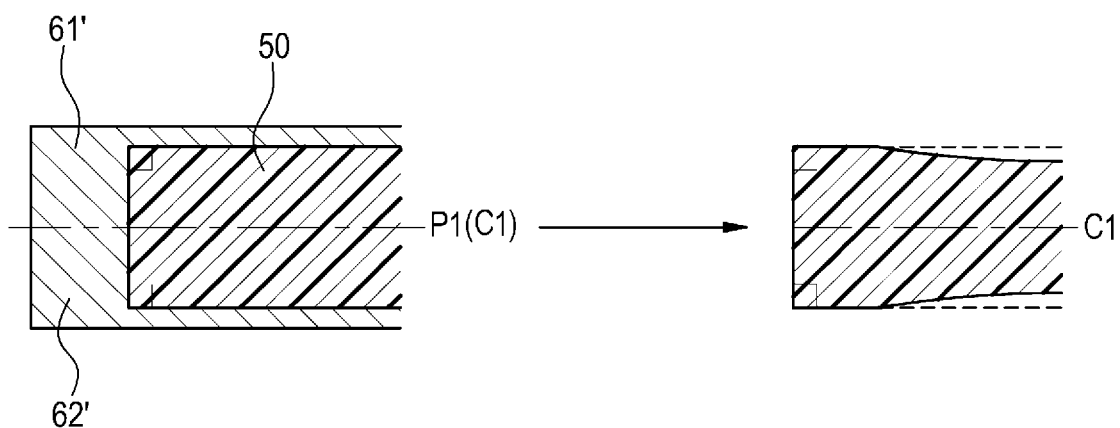
FIG. 24 is a cross-sectional view showing a comparative example of FIG. 23.

FIG. 24 is a cross-sectional view of a substrate as the comparative example when corner portions of an end portion of the substrate are formed at 90 degrees instead of obtuse angles. As shown in FIG. 24, the resin 50 is injected into a cavity of a pair of molds 61' and 62'. In the cross-sectional view, an angle between adjacent surfaces of the injected resin 50 is 90 degrees. When the angle is 90 degrees, since two surfaces forming the angle are in contact with the molds, the resin 50 is cooled from both sides of the two surfaces. As a result, as compared with other portions, the corner portions are cooled more quickly, solidified more easily, and molded and shrunk more hardly. On the other hand, since the other portions are not cooled from two directions, the other portions are cooled more slowly, solidified more hardly, and molded and shrunk more easily as compared with the corner portions. Therefore, a difference in molding shrinkage is generated between the corner portions and the other portions, and the substrate may be distorted. When an angle of each of the corner portions is an acute angle, as compared with a case where the angle is 90 degrees, the corner portion is cooled more easily, and thus the difference in molding shrinkage is more easily generated.

In contrast, in the present embodiment, the substrate 330 is molded such that at least a part of the end portions of the substrate 330 is formed with the at least three obtuse angles $\theta1$, $\theta2$, and $\theta3$ in the cross section of the substrate 330 in the thickness direction. For example, a vicinity of the angle $\theta3'$ is cooled from both sides of the surface 53 and the surface 54, but since the angle $\theta3'$ is the obtuse angle, the vicinity of the angle $\theta3'$ is cooled more slowly and solidified more hardly as compared with the case where the angle is 90 degrees. Similarly, a vicinity of the angle $\theta1'$ is cooled from both sides of the surface 51 and the surface 53, and the angle $\theta2'$ is cooled from both sides of the surface 52 and the surface 54, but the vicinity of the angle $\theta1'$ and the angle $\theta2'$ are cooled more slowly and solidified more hardly as compared with the case where the angle is 90 degrees. As a result, the vicinities of the angles $\theta1'$, $\theta2'$, and $\theta3'$ are easily molded and shrunk. Even when the vicinities of the angles $\theta1'$, $\theta2'$, and $\theta3'$ are compared with portions other than the angles $\theta1'$, $\theta2'$, and $\theta3'$, the difference in molding shrinkage is unlikely to be generated.

As described above, according to the third embodiment, since the lower end portion 335 of the substrate 330 is formed with the surfaces that form the at least three obtuse angles $\theta1$, $\theta2$, and $\theta3$, the vicinities of these obtuse angles are cooled and solidified more hardly as compared with the case where the angle of each of the corner portions is the acute angle or 90 degrees. Therefore, distortion of the substrate 330 during molding is prevented. The concave mirror 26 including the substrate 330 and including a concave curved surface can reflect the light emitted from the picture generation apparatus 24 while preventing an influence of the distortion of the substrate 330. In the head-up display 20 including the concave mirror 26, distortion of the picture to be displayed is prevented. Furthermore, since the lower end portion 335 is formed with the third surface 343 and the fourth surface 344 that form the obtuse angles $\theta1$, $\theta2$, and $\theta3$, a part of the light emitted from the picture generation apparatus 24 is reflected by the third surface 343 and the fourth surface 344 in a direction different from the emitting window 23. Since the light at a position where the distortion easily occurs during molding is reflected in the different direction, the distortion of the picture to be displayed is further prevented.

In the third embodiment, the three obtuse angles $\theta1$, $\theta2$, and $\theta3$ are formed at each of the upper end portion 334 and the lower end portion 335 corresponding to the long sides of the substrate 330 having the rectangular shape. Therefore, the substrate 330 whose distortion at each of the upper end portion 334 and the lower end portion 335 is prevented can be molded.

When the third surface 343 and the fourth surface 344 (three obtuse angles $\theta1$, $\theta2$, and $\theta3$) are not formed to be line-symmetric with each other, one portion that is rapidly cooled and the other portion that is slowly cooled are formed in a cross-sectional view of one end surface, which may cause the distortion during molding. However, in the present embodiment, the third surface 343 and the fourth surface 344 (three obtuse angles $\theta1$, $\theta2$, and $\theta3$) are formed to be line-symmetric with respect to the center of the substrate 330 in the thickness direction. Therefore, the resin 50 for the substrate 330 is uniformly cooled from the third surface 343 and the fourth surface 344, and the distortion of the substrate 330 during molding is further prevented.

In the third embodiment, the three obtuse angles $\theta1$, $\theta2$, and $\theta3$ are formed at each of the long sides of the substrate 330 having the rectangular shape, but the three obtuse angles $\theta1$, $\theta2$, and $\theta3$ may be formed over the entire outer periphery of the substrate 330. That is, the three obtuse angles $\theta1$, $\theta2$, and $\theta3$ may also be formed at each of the right end portion 336 and the left end portion 337 where the pair of ribs 338 are formed. Since the three obtuse angles $\theta1$, $\theta2$, and $\theta3$ are formed over the entire outer periphery, the distortion of the substrate 330 during molding is further prevented.

Figure 25:
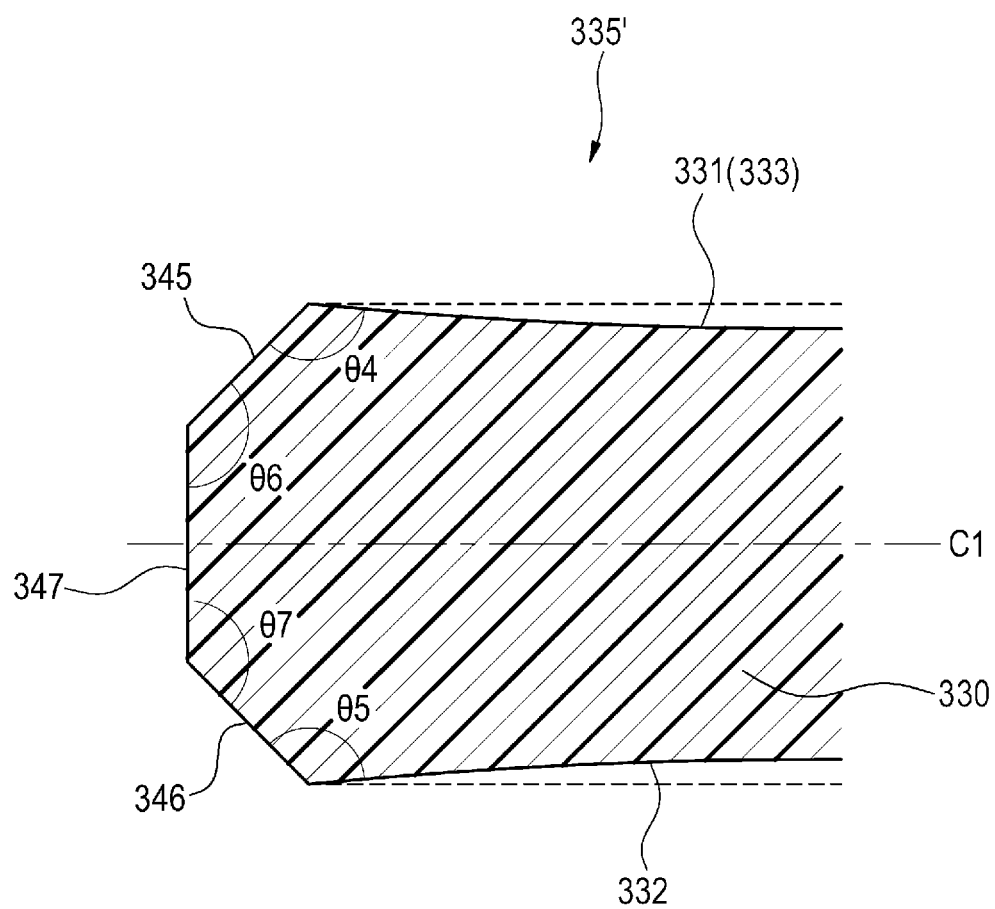
FIG. 25 is an enlarged cross-sectional view of a modification of the end portion of the reflector.

In the third embodiment, the three obtuse angles $\theta1$, $\theta2$, and $\theta3$ are formed, but the number of obtuse angles is not limited to three. FIG. 25 is an enlarged cross-sectional view of a modification of the lower end portion 335. As shown in FIG. 25, in the present modification, a lower end portion 335' is formed with four obtuse angles $\theta4$, $\theta5$, $\theta6$, and $\theta7$. Specifically, a fifth surface 345, a sixth surface 346, and a seventh surface 347 are provided between the first surface 331 and the second surface 332. The fifth surface 345 is a surface extending from the first surface 331 to the seventh surface 347. The sixth surface 346 is a surface extending from the second surface 332 to the seventh surface 347. The seventh surface 347 is a surface extending from the fifth surface 345 to the sixth surface 346. The fifth surface 345 and the sixth surface 346 are formed to be line-symmetric with respect to the center C1 of the substrate 330 in the thickness direction, and the seventh surface 347 is formed to be line-symmetric with respect to the center C1 of the substrate 330 in the thickness direction. The fifth surface 345, the sixth surface 346, and the seventh surface 347 are provided on the lower end portion 335' that is one long side of the substrate 330, but are also provided on an upper end portion 334' that is the other long side in addition to the lower end portion 335'. Furthermore, the fifth surface 345, the sixth surface 346, and the seventh surface 347 may be formed over the entire outer periphery of the substrate 330.

An angle θ4 between the first surface 331 and the fifth surface 345 is an obtuse angle. An angle θ5 between the second surface 332 and the sixth surface 346 is an obtuse angle. An angle θ6 between the fifth surface 345 and the seventh surface 347 is an obtuse angle. An angle θ7 between the sixth surface 346 and the seventh surface 347 is an obtuse angle. In other words, each of the two long sides of the substrate 330 is formed with four obtuse angles θ4, θ5, θ6, and θ7 in the cross section of the substrate in the thickness direction. Since an injection molding method of the modification is the same as a method in FIG. 23 except for a shape of the mold, description thereof is omitted.

According to the modification, since the lower end portion 335' of the substrate 330 is formed with the four obtuse angles θ4, θ5, θ6, and θ7, the vicinities of these obtuse angles are cooled and solidified more hardly as compared with the case where the angle of each of the corner portions is the acute angle or 90 degrees. Therefore, the distortion of the substrate 330 during molding is prevented.

Although embodiments of the present invention have been described above, it is needless to say that the technical scope of the present invention should not be interpreted as being limited to the description of the above embodiments. It is to be understood by those skilled in the art that the above embodiments are merely examples and various modifications may be made within the scope of the invention described in the claims. The technical scope of the present invention should be determined based on the scope of the invention described in the claims and an equivalent scope thereof.

In the above embodiments, the light emitted from each of the picture generation apparatuses 24 and 1024 is reflected by the concave mirror 26 and is then emitted to the windshield 18, but the present invention is not limited thereto. For example, the light reflected by the concave mirror 26 may be emitted to a combiner (not shown) provided inside the windshield 18. The combiner is implemented by, for example, a transparent plastic disk. Similarly to a case where the light is emitted to the windshield 18, a part of the light emitted from the picture generation apparatus 24 or 1024 in the HUD main body portion 21 to the combiner is reflected toward the viewpoint E of the occupant.

In the above embodiments, the driving mode of the vehicle has been described as including the fully automatic driving mode, the advanced driving support mode, the driving support mode, and the manual driving mode, but the driving mode of the vehicle should not be limited to these four modes. The driving mode of the vehicle may include at least one of these four modes. For example, only one driving mode of the vehicle may be executed.

Furthermore, a classification and display form of the driving mode of the vehicle may be appropriately changed according to laws or regulations related to automatic driving in each country. Similarly, definitions of the "fully automatic driving mode", the "advanced driving support mode", and the "driving support mode" in the description of the present embodiments are merely examples and may be appropriately changed according to the laws or the regulations related to the automatic driving in each country.

In the second embodiment described above, the tip end of the first protruding portion 33 and the tip end of the second protruding portion 34 are respectively located outside the first end surface 263 and the second end surface 264 in the direction along the rotation axis D, but the present invention is not limited to the example. The tip end of the first protruding portion 33 may be located outside the first end surface 263 in the direction along the rotation axis D, and the tip end of the second protruding portion 34 may be located at the same position as the second end surface 264 in the direction along the rotation axis D. Alternatively, a reverse configuration may be used. Even in the configuration, the extraction angle of the mold can be secured, and thus it is possible to increase a size of the main body portion 31 while maintaining the moldability of the concave mirror 26.

In the second embodiment described above, the first shaft portion 35 and the second shaft portion 36 of the concave mirror 26 are directly attached to the first accommodation portion 310 and the second accommodation portion 320 of the main body housing 22, respectively, but the present invention is not limited thereto. For example, an attachment member, which is formed as a member separate from the concave mirror 26, may be provided on a second shaft portion 36 side of the concave mirror 26, and the concave mirror 26 may be indirectly attached to the main body housing 22 via the attachment member. Thus, when at least one of the first shaft portion 35 and the second shaft portion 36 is directly attached to the main body housing 22, an effect of reducing the number of components can be expected.

The present application is based on Japanese Patent Application No. 2020-55742 filed on Mar. 26, 2020, Japanese Patent Application No. 2020-55743 filed on Mar. 26, 2020, Japanese Patent Application No. 2020-77611 filed on Apr. 24, 2020, Japanese Patent Application No. 2020-77612 filed on Apr. 24, 2020, and Japanese Patent Application No. 2020-88272 filed on May 20, 2020, the contents of which are incorporated herein by reference.

The invention claimed is:

1. A picture generation apparatus that generates a picture for a head-up display, the picture generation apparatus comprising:
    a light source substrate on which a light source is mounted;
    an optical member through which light emitted from the light source is transmitted;
    a display device configured to form, by the light transmitted through the optical member, light for generating a predetermined picture;
    a heat sink configured to dissipate heat generated from the light source substrate; and
    a holder configured to hold the optical member,
    wherein the holder includes a plurality of first engagement portions, and the heat sink includes a plurality of second engagement portions that are respectively provided at positions corresponding to the plurality of first engagement portions,
    wherein each of the plurality of first engagement portions and a respective one of the plurality of second engagement portions are fixed to each other, so that the light source substrate is positioned and fixed in a state of being interposed between the holder and the heat sink and being accommodated in a space that is formed among the plurality of first engagement portions, wherein the holder includes a pair of first surfaces parallel to a light emitting surface of the display device, and a second surface formed between the pair of first surfaces and inclined with respect to the pair of first surfaces, wherein the plurality of first engagement portions are hole portions formed in the pair of first surfaces, wherein the second surface includes an opening and a frame portion that surrounds a periphery of the opening, and wherein the light source substrate is attached to the frame portion so that the light source is disposed in the opening.

2. The picture generation apparatus according to claim 1, wherein the light source substrate includes at least one hole portion, and wherein at least one pin insertable into the at least one hole portion protrudes from the frame portion.

3. The picture generation apparatus according to claim 1, wherein the heat sink further includes:

a pair of third surfaces which are surfaces parallel to the pair of first surfaces and in which the plurality of second engagement portions are formed; and a fourth surface which is formed between the pair of third surfaces and is parallel to the second surface, and wherein the light source substrate is accommodated in a space formed between the second surface and the fourth surface.

4. The picture generation apparatus according to claim 1, further comprising:

a housing to which the display device is mountable, wherein the holder and the heat sink are attached to the housing by the plurality of first engagement portions and the plurality of second engagement portions.

5. The picture generation apparatus according to claim 4, further comprising:

a circuit board configured to control at least the display device; and a rear surface cover configured to cover a rear surface of the housing, wherein the rear surface cover is attached to the housing in a state where the circuit board is attached to the housing such that the circuit board is disposed between the heat sink and the rear surface cover.

6. The picture generation apparatus according to claim 5, wherein the rear surface cover includes a rear surface portion and a side surface portion that rises from the rear surface portion, wherein the rear surface portion is formed with at least one engagement hole that is screwable to a boss protruding from the housing toward the rear surface cover, and an area in which the at least one engagement hole is formed is more recessed, than other areas of the rear surface portion, in a direction in which the rear surface cover is attached to the housing.

* * * * *